(12) United States Patent
Wu et al.

(10) Patent No.: US 10,225,138 B2
(45) Date of Patent: Mar. 5, 2019

(54) SCALABLE AND AUTOMATED NETWORK-PARAMETER ASSIGNMENT

(71) Applicant: Architecture Technology Corporation, Minneapolis, MN (US)

(72) Inventors: John Wu, Eden Prairie, MN (US); Nathan Bahr, Eden Prairie, MN (US); Ranga Ramanujan, Hamel, MN (US); Brett Thompson, St. Louis Park, MN (US); Steven M. Schneider, Shakopee, MN (US); Corey Webster, Minneapolis, MN (US)

(73) Assignee: Architecture Technology Corporation, Minneapolis, MN (US)

( * ) Notice: Subject to any disclaimer, the term of this patent is extended or adjusted under 35 U.S.C. 154(b) by 231 days.

(21) Appl. No.: 15/044,760

(22) Filed: Feb. 16, 2016

(65) Prior Publication Data

US 2017/0237608 A1 Aug. 17, 2017

(51) Int. Cl.
*G06F 15/177* (2006.01)
*H04L 12/24* (2006.01)
*H04L 29/12* (2006.01)

(52) U.S. Cl.
CPC ........ *H04L 41/0803* (2013.01); *G06F 15/177* (2013.01); *H04L 61/2015* (2013.01); *H04L 61/103* (2013.01)

(58) Field of Classification Search
CPC ............................. G06F 15/177; H04L 61/2015
See application file for complete search history.

(56) References Cited

U.S. PATENT DOCUMENTS

| | | | | |
|---|---|---|---|---|
| 2002/0052876 | A1* | 5/2002 | Waters | H04L 29/12216 |
| 2007/0101132 | A1* | 5/2007 | Cuellar | H04L 41/08 |
| | | | | 713/168 |
| 2008/0065747 | A1* | 3/2008 | Kubota | H04L 29/1282 |
| | | | | 709/220 |

(Continued)

OTHER PUBLICATIONS

"Dynamic Host Configuration Protocol for Tactical Networks (DHCP-T)," SBIR.gov, retrieved on Nov. 23, 2015 from https://www.sbir.gov/content/dynamic-host-configuration-protocol-tactical-networks-dhcp-t, Submitted on Mar. 4, 2014, 5 pp.

(Continued)

*Primary Examiner* — Jeong S Park
(74) *Attorney, Agent, or Firm* — Shumaker & Sieffert, P.A.

(57) ABSTRACT

In one example, in a Dynamic Host Configuration Protocol (DHCP) network comprising one or more configuration computing systems, a method includes receiving one or more augmented DHCP configuration messages. The method also includes determining that each of the one or more augmented DHCP configuration messages includes a message tag indicating that the respective augmented DHCP configuration message contains parameter information that includes a client identifier associated with a respective one of the one or more network devices. The method further includes determining, based on the parameter information included in each of the one or more augmented DHCP configuration messages, configuration data that is usable to configure the one or more network devices. The method also includes configuring, based on the configuration data, the one or more network devices.

37 Claims, 25 Drawing Sheets

(56) References Cited

U.S. PATENT DOCUMENTS

| | | | | |
|---|---|---|---|---|
| 2010/0191813 A1* | 7/2010 | Gandhewar | ......... | H04L 61/2015 709/206 |
| 2011/0019660 A1* | 1/2011 | Kumarasamy | ...... | H04L 65/1059 370/352 |
| 2013/0097294 A1* | 4/2013 | Deng | .................. | H04L 12/4679 709/221 |
| 2015/0128249 A1* | 5/2015 | Alexandrian | ......... | G06F 21/629 726/16 |

OTHER PUBLICATIONS

"Dynamic Host Configuration Protocol for Tactical Networks (DHCP-T)," SBIR.gov, retrieved on Oct. 14, 2015 from https://www.sbir.gov/sbirsearch/detail/666260, 4 pp.

"Dynamic Host Configuration Protocol for Tactical Networks (DHCP-T)," SBIR.gov, retreived on Oct. 14, 2015 from https://www.sbir.gov/sbirsearch/detail/818561, 4 pp.

"Dynamic Host Configuration Protocol for Tactical Networks (DHCP-T)," SBIR.gov, retrieved on Oct. 14, 2015 from https://www.sbir.gov/node/818559, submitted on Jul. 14, 2015; 5 pp.

* cited by examiner

FIG. 4H

SCALABLE AND AUTOMATED NETWORK-PARAMETER ASSIGNMENT

STATEMENT REGARDING FEDERALLY SPONSORED RESEARCH OR DEVELOPMENT

This invention was made with Government support under Contract No. W15P7T-13-C-A306, Contract No. W56KGU-14-C-0061, and Contract No. W56KGU-15-C-0003 awarded by the United States Army. The government has certain rights in this invention

BACKGROUND

The initialization, configuration, and re-configuration of communication network devices in tactical networks, as one example, may require manual loading of network parameters, which is often non-scalable and costly. For instance, manual loading of network parameters may take several weeks to fully configure a mission command system for a mission change and also may be labor-intensive, time consuming, error prone. As a result, devices that require manual loading of network parameters may be unable to adapt quickly to system changes (e.g., mission changes).

SUMMARY

In one example, in a Dynamic Host Configuration Protocol (DHCP) network comprising one or more configuration computing systems, a method includes receiving one or more augmented DHCP configuration messages. The method also includes determining that each of the one or more augmented DHCP configuration messages includes a message tag indicating that the respective augmented DHCP configuration message contains parameter information that includes a client identifier associated with a respective one of the one or more network devices. The method further includes determining, based on the parameter information included in each of the one or more augmented DHCP configuration messages, configuration data that is usable to configure the one or more network devices. The method also includes configuring, based on the configuration data, the one or more network devices.

In another example, in a DHCP network comprising one or more network devices and one or more configuration computing systems, a method includes generating one or more augmented DHCP configuration messages, wherein each of the one or more augmented DHCP configuration messages includes a message tag indicating that the respective augmented DHCP configuration message contains additional parameter information that includes a client identifier associated with a respective one of the one or more network devices. The method also includes transmitting the one or more augmented DHCP configuration messages to request that the one or more configuration computing systems configure the one or more network devices. The method further includes configuring, based on configuration data received from the one or more configuration computing systems, the one or more network devices.

In another example, a system may include one or more processors, one or more computer-readable storage media, program instructions to receive one or more augmented DHCP configuration messages; to determine that each of the one or more augmented DHCP configuration messages includes a message tag indicating that the respective augmented DHCP configuration message contains parameter information that includes a client identifier associated with a respective one of the one or more network devices; to determine; based on the parameter information included in each of the one or more augmented DHCP configuration messages, configuration data that is usable to configure the one or more network devices; and to configure, based on the configuration data, the one or more network devices.

In another example, a system may include one or more processors, one or more computer-readable storage media, and program instructions to generate one or more augmented DHCP configuration messages, wherein each of the one or more augmented DHCP configuration messages includes a message tag indicating that the respective augmented DHCP configuration message contains additional parameter information that includes a client identifier associated with a respective one of the one or more network devices; and to transmit the one or more augmented DHCP configuration messages to request that the one or more configuration computing systems configure the one or more network devices.

In another example, a system may include one or more processors and one or more computer-readable storage media. The system may also include a server core module operable by the one or more processors to interact with one or more network devices based on one or more augmented DHCP configuration messages, and to provide configuration data to one or more client devices, wherein the server core module comprises a message module to generate the one or more augmented DHCP configuration messages; a modular interface adapter to interface with one or more data sources, wherein the one or more data sources store source configuration data associated with the one or more network devices; and a configuration interface to presenting an interface to configure the one or more network devices.

The details of one or more examples are set forth in the accompanying drawings and the description below. Other features, objects, and advantages of the disclosure will be apparent from the description and drawings, and from the claims.

BRIEF DESCRIPTION OF DRAWINGS

FIGS. 4A-4L illustrate example interfaces by which a network administrator may configure network devices, in accordance with one or more aspects of the present disclosure.

DETAILED DESCRIPTION

Initialization and configuration of network devices in a tactical environment may require loading of network configuration parameters that may be tailored to specific mission command systems. Tactical networks often utilize non-standard processes across uncoordinated organizations, typically requiring manual loading of network parameters tailored to specific mission command systems. For example, with each mission change, such as a Unit Task Reorganization (UTR), a specialist may reassign a particular military unit under a new battalion. Officers may configure a military unit's tactical network devices, which may include host computers, tactical routers, and radios. In some cases, such a manually driven process may take several weeks to complete. As described herein, in one or more examples of the present disclosure, the use of a scalable and automated initialization and reconfiguration system in tactical environments may eliminate the labor-intensive and manual loading of network parameters, such as parameters that are specifically tailored to mission command systems.

One or more techniques described in the present disclosure provide an automated network parameter assignment process for efficiently initializing, configuring, and reconfiguring network devices under various connection scenarios. This automated network parameter assignment process may be referred to as Dynamic Host Configuration Protocol for Tactical Networks (DHCP-T). As described herein, in one or more examples, DHCP-T may provide an augmented message system for rapid and accurate initialization and configuration of systems (e.g., mission command systems) to support tactical network initialization and unit task reorganization. In some cases, in addition to using media access control (MAC) addresses as client identifiers, DHCP-T may also allow dynamic configuration of IP address on a network communication device using client identifiers (e.g., log-in role) from a designation location on the client device and include it within augmented DHCP configuration messages. DHCP-T may further provide server-initiated network configuration. DHCP-T may acquire IP addressing information from various data sources in order to configure network devices. DHCP-T may further perform configuration that is specific to tactical operations (e.g., the Unit Reference Number (URN) and role names), and may further reduce or eliminate load balancing issues, server redundancy, and interference with non-tactical DHCP services and purpose-built servers handling mission-specific network initialization.

Figure 1:
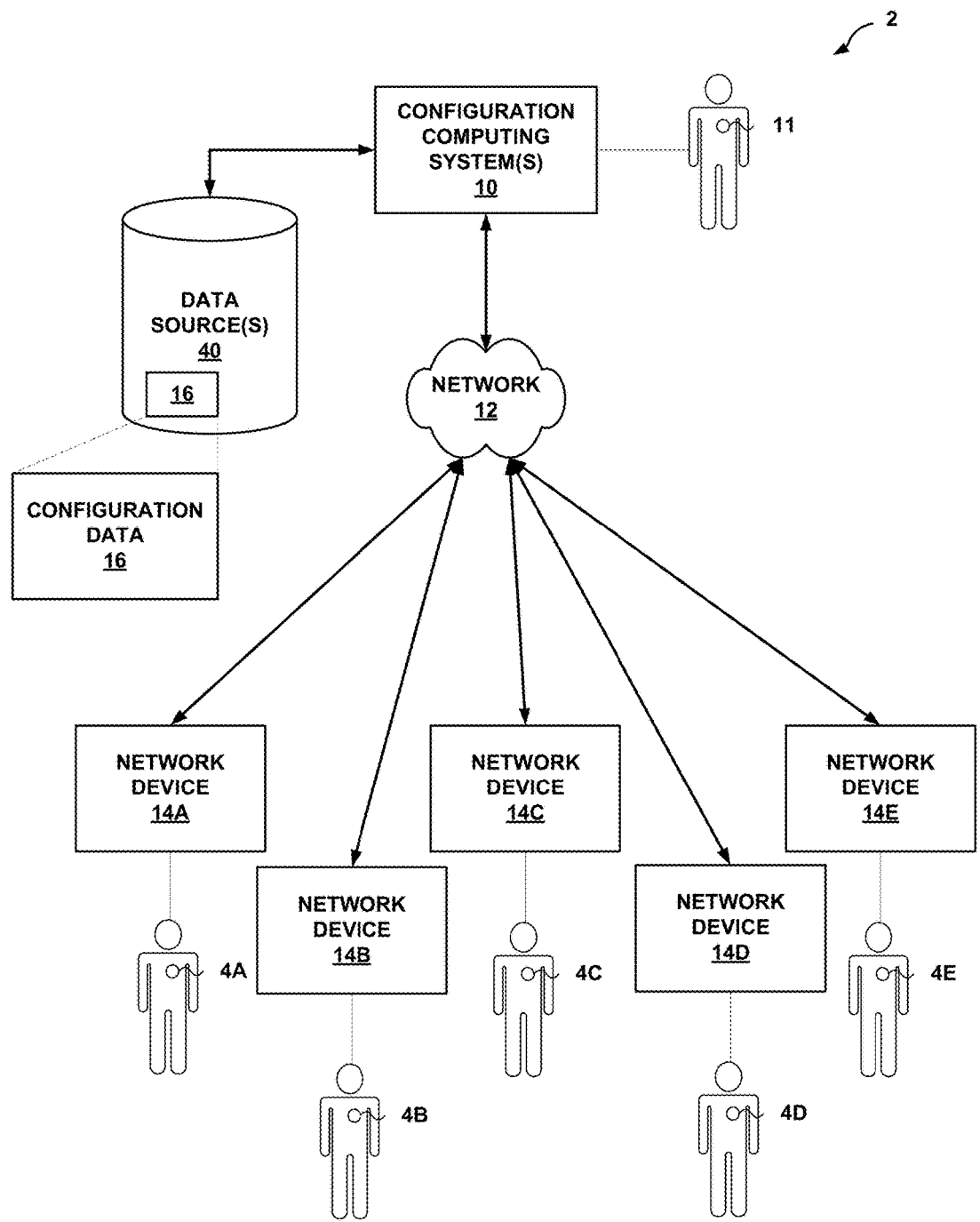
FIG. 1 is a block diagram illustrating an example networking system in accordance with one or more aspects of the present disclosure.

FIG. 1 is a block diagram illustrating an example tactical networking system 2, in accordance with one or more aspects of the present disclosure. As shown in FIG. 1, one or more network administrators 11 ("network administrators 11"), such as NetOps specialists, may use one or more configuration computing systems 10 to configure one or more network devices 14A-14E (collectively "network devices 14") with configuration data 16 stored in one or more data sources 40 through a network 12. Network devices 14 are coupled to configuration computing systems 10 through network 12, which may include various network connections including Wide Area Network (WAN), Metropolitan Area Network (MAN), Personal Area Network (PAN), Virtual Private Network (VPN), Campus Area Network (CAN), Enterprise Private Network, Home area Network, Storage Area Network, radio networks, and other computer networks. Configuration computing systems 10 are coupled to data sources 40 that may be internal or external to configuration computing systems 10.

Configuration computing systems 10 and network devices 14 may communicate with each other using augmented DHCP configuration messages (e.g., DHCP-T messages) that augment current DHCP standards, which may enable initialization and configuration of network devices 14 in accordance with the DHCP-T protocol. For example, network devices 14 may generate and transmit one or more augmented DHCP configuration messages to configuration computing systems 10 to request configuration. The augmented DHCP configuration messages may include a message tag to indicate that the augmented DHCP configuration messages may contain additional parameter information, such as client identifiers unique to network devices 14 at any given time. Configuration computing systems 10 may receive the augmented DHCP configuration messages from network devices 14, which may signify that network devices 14 requests configuration under the DHCP-T protocol. Configuration computing systems 10 may then determine that the message from network devices 14 is an augmented DHCP configuration message and may distinguish the augmented DHCP configuration message from standard DHCP messages. By receiving an augmented DHCP configuration message, configuration computing systems 10 may trigger configuration of the respective network devices 14 with configuration data 16 associated with client identifiers of the network devices 14. Configuration data 16 may include parameter information, such as client identifiers and/or mission-specific configuration parameters (e.g., roles, URN, IP address, mission related data).

Configuration computing devices 10 may communicate with one or more of the data sources 40 to obtain and store the configuration data 16 (e.g., mission related data) associated with the network devices 14. In response to obtaining the respective configuration data 16, configuration computing devices 10 may configure the network devices 14 with the configuration data 16.

In another example, configuration computing systems 10 may initiate the configuration of network devices 14 upon determining that configuration data 16 in data sources 40 has changed. For instance, current configuration data associated with network devices 14 may be periodically updated to data sources 40. Configuration computing systems 10 may determine that the current configuration data does not match the newest configuration data 16 stored in data sources 40. Configuration computing systems 10 may then initiate the configuration of network devices 14 to configure the network devices 14 with the newest configuration data 16.

Utilizing augmented DHCP configuration messages enables rapid and accurate initialization and configuration of systems to support tactical network initialization and unit task reorganization. In some cases, utilizing augmented DHCP configuration messages also enables server-initiated network configuration.

Figure 2:
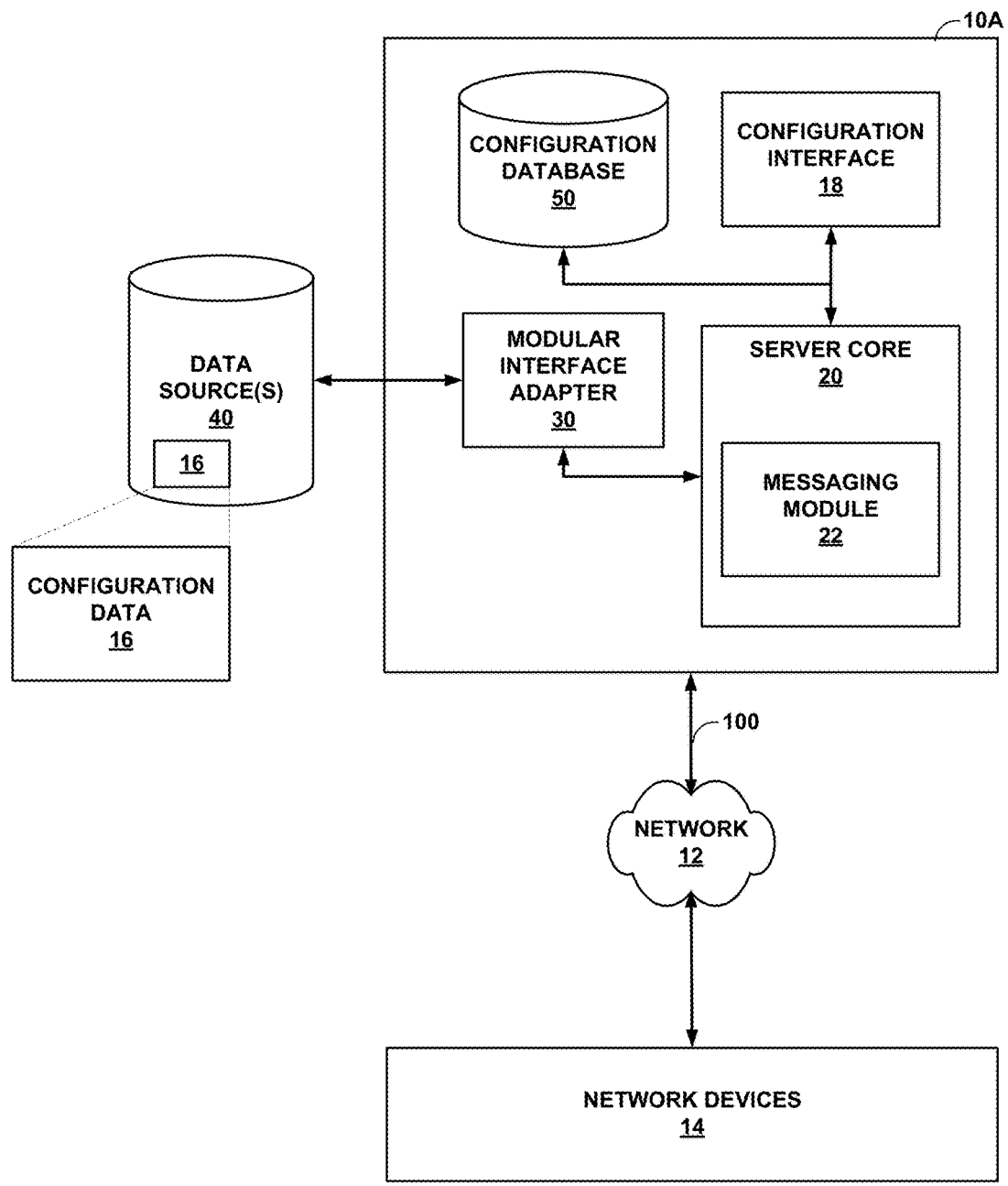
FIG. 2 is a block diagram illustrating an example configuration computing system, in accordance with one or more aspects of the disclosure.

FIG. 2 is a block diagram illustrating an example of the one or more configuration computing systems 10, in accordance with one or more aspects of the disclosure. In one example, configuration computing system 10A may include a server core 20 for communicating with one or more network devices 14 based on augmented DHCP configuration messages 100. Server core 20 may also interface with various components of configuration computing systems 10, including the modular interface adapter 30, the configuration interface 18, and the configuration database 50.

Server core 20 may provide dynamic initialization services to tactical network devices 14 and to regular DHCP network devices. To generate and/or detect the augmented DHCP configuration messages 100, server core 20 may include a messaging module 22. Messaging module 22 may determine augmented DHCP configuration messages 100 from standard DHCP messages. For example, messaging module 22 may examine data formats of DHCP packets to determine if the DHCP packet includes a message tag. In one instance, messaging module 22 may determine that a DHCP packet received from configuration computing system 10 may include DHCP-T specific header and data fields. This in turn enables configuration computing system 10A to determine that the incoming DHCP packet is an augmented DHCP configuration message 100.

The messaging module 22 may also generate augmented configuration messages 100 to communicate with each of the network devices 14 so that data in addition to standard DHCP messages may be transmitted to the network devices 14. Configuration computing system 10A may further include a modular interface adapter 30 for interoperation with one or more data sources 40 (e.g., command and control registration services (C2R), MySQL, etc.) that store configuration data 16 (e.g., network parameters) and may be across multiple service agencies. In particular, server core 20 may interact with the modular interface adapters 30 to interoperate with an external data sources 40. Modular interface adapter 30 may build interfaces with added data sources 40 or modify an existing interface with data sources 40 that have been modified. The modular interface adapter 30 may develop adapters for each external data source 40 so that external data sources 40 may be specified at runtime for the configuration computing system 10A via the configuration interface 18. Modular interface 30 may modify the input and output parameters to each interface adapter to its corresponding external data source 40.

The modular interface adapter 30 may allow configuration computing system 10A to quickly adapt to interface with new data sources 40 without disruption to the initialization and configuration of network devices 14. The modular interface adapter 30 may also modify the interface with data source 40 if the interface and/or parameters of the data source 40 are changed. In one example, data source 40 in tactical applications may include, but is not limited to, the Command and Control Registry (C2R), which is a repository for addressing information such as email addresses, military addresses, and network information for messaging. The configuration computing system 10A may present a configuration interface 18 by which network administrators 11 may specify the interface adapters for a data source 40 so that the network administrators 11 may add and edit parameters that may be used to configure network devices 14 in the network. In one instance, the modular interface adapter 30 may interface the configuration computing system 10A with a C2R data source by translating a data source query message received from the configuration computing system 10A into C2R specific commands such as QUERY_ROLES and/or QUERY_UNITS to retrieve the role and unit information stored within the C2R data source. The modular interface adapter 30 may also translate a data source update message received from the configuration computing system 10 into C2R specific commands such as UPDATE_ROLES and/or UPDATE_UNITS for updating the role and unit information into the C2R data source. The modular interface adapter 30 may develop adapters for various data sources 40 to interoperate with multiple command and control registration services.

Network administrators 11 may also specify, with configuration interface 18, the configuration of the configuration computing system 10A and network devices 14, including the configuration data 16 sent to network devices 14, how the configuration data 16 is obtained from a data store 40, and how the network devices 14 may handle the configuration data 16 according to the platform type hosting the network device 14. The configuration interface 18 may also present network administrators 11 with an interface to enable the configuration computing system 10A to periodically update a configuration database 50 with the newest configuration data 16 from data source 40. For example, configuration database 50 may store configuration data 16 from data source 40. Configuration database 50 may be an intermediary or local data storage for configuration data 16 retrieved from the data sources 40. Configuration computing system 10 may keep track of the configuration data 16 for network devices 14 under management and quickly renew the configuration data 16 upon request for initialization from the network devices 14. Upon initialization of configuration, an entry may be created in the configuration database 50 to store the configuration data 16 retrieved from data source 40.

Configuration computing system 10A may also periodically pre-populate the configuration database 50 with current configuration data 16 from data source 40 based on a predefined group of network devices 14 (e.g., under the battalion network) prior to network devices 14 requesting configuration. Pre-populating the configuration database 50 with the current configuration data 16 enables configuration computing system 10A to remain up-to-date with the current configuration data 16, thereby allowing configuration computing system 10A to determine whether to initiate the configuration of network devices 14 with the newest configuration data 16. Pre-populating the configuration database 50 with current configuration data 16 provides reliability and resilience for tactical environments by allowing initialization of network devices 14 irrespective of the status of external data source 40 (e.g., when data source 40 is unavailable). Configuration data 16 may also persist in the internal memory of the configuration computing system 10A and the configuration database 50 so that configuration computing system 10A may recover the current state of configuration in the event the data source 40 is unavailable.

Figure 3:
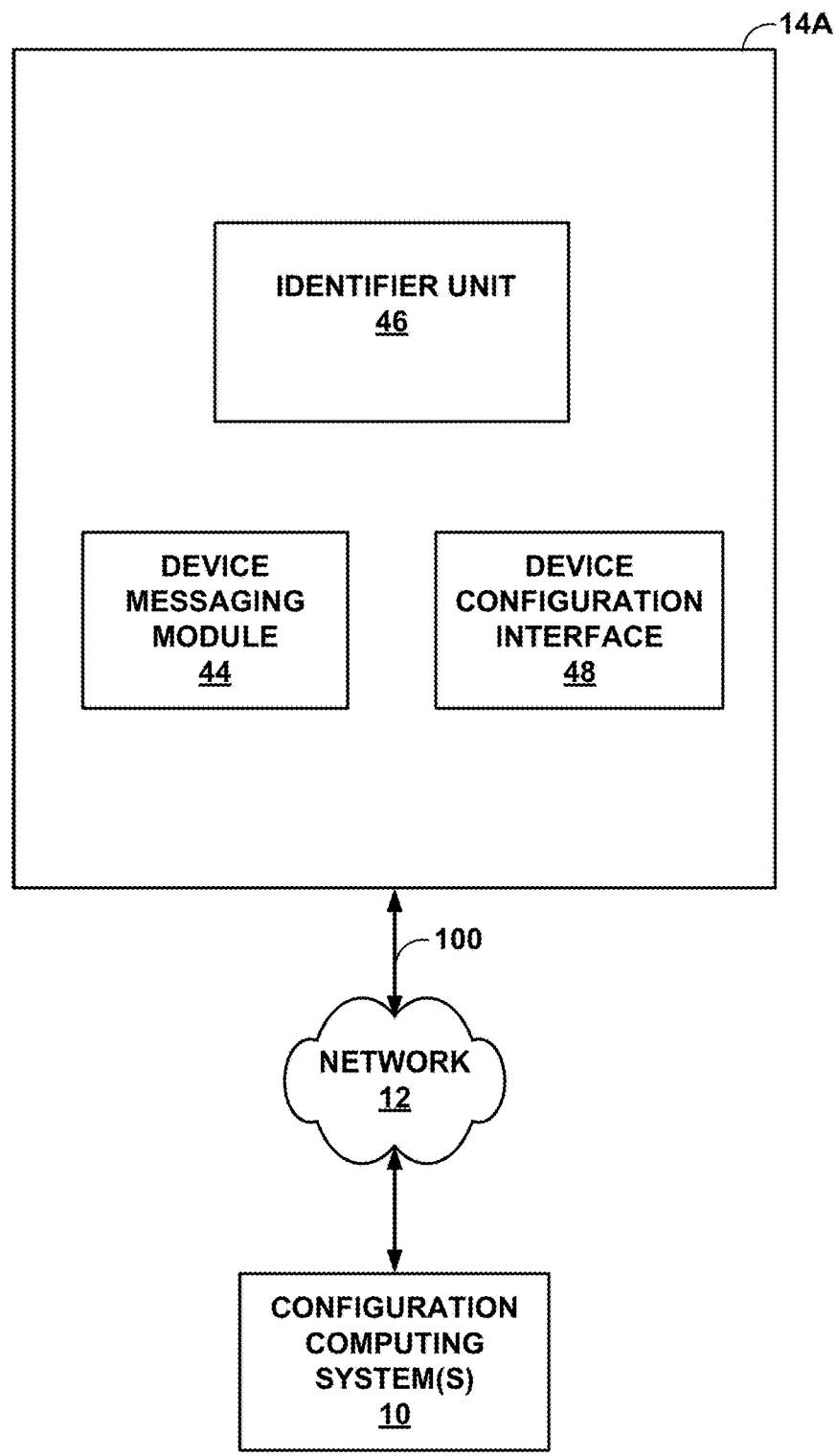
FIG. 3 is a block diagram illustrating an example network device, in accordance with one or aspects of the present disclosure.

FIG. 3 is a block diagram illustrating an example of the one or more network devices 14, in accordance with one or more aspects of the disclosure. Network device 14A is a non-limiting example of one network device of the one or more network devices 14. An identifier unit 46 may be built into network devices 14A to automatically obtain one or more client identifiers uniquely associated with the network device 14A, such as a media access control (MAC) address, a Unit Reference Number (URN), role names, log-in role of the network users 4, and other identifying information associated with network users 4A-4E (collectively "network users 4") and/or specified by network administrators 11. A MAC address is a unique physical address of each of the network devices 14 that may be included in augmented DHCP configuration messages. URNS are client identifiers to identify tactical units, devices, organizations, vehicles, and messaging groups for enabling communication. URNS may also be included in augmented DHCP configuration messages. Typically, unit and role names are organizational divisions within the military to identify a group of individuals. The unit and role names may additionally be included in augmented DHCP configuration messages. The identifier unit 46 may obtain the client identifier associated with network device 14A so that configuration computing systems 10 may utilize the obtained client identifier to identify the configuration parameters specifically associated with network device 14A.

Network device 14A may also include a device messaging module 44 for generating and/or detecting augmented DHCP configuration messages 100, and may differentiate augmented DHCP configuration messages 100 from standard DHCP messages. For example, device messaging module 44 may examine data formats of DHCP packets to determine if the DHCP packet includes a message tag. In one instance, device messaging module 44 may determine that a DHCP packet received from configuration computing system 10 may include DHCP-T specific header and data fields. This in turn enables network device 14A to determine that the incoming DHCP packet is an augmented DHCP configuration message 100. The device messaging module 44 may also generate augmented DHCP configuration messages 100 to communicate with the configuration computing system 10 so that only the configuration data 16 from configuration computing system 10 may be requested.

Network device 14A may also present a device configuration interface 48 by which network administrators 11 or network users 4 may specify the configuration of the network device 14, including the configuration data 16 and client identifier. For instance, network users 4 may interact with device configuration interface 48 to select or enter client identifiers (e.g., URN or roles) uniquely associated with network users 4.

Figure 4A:
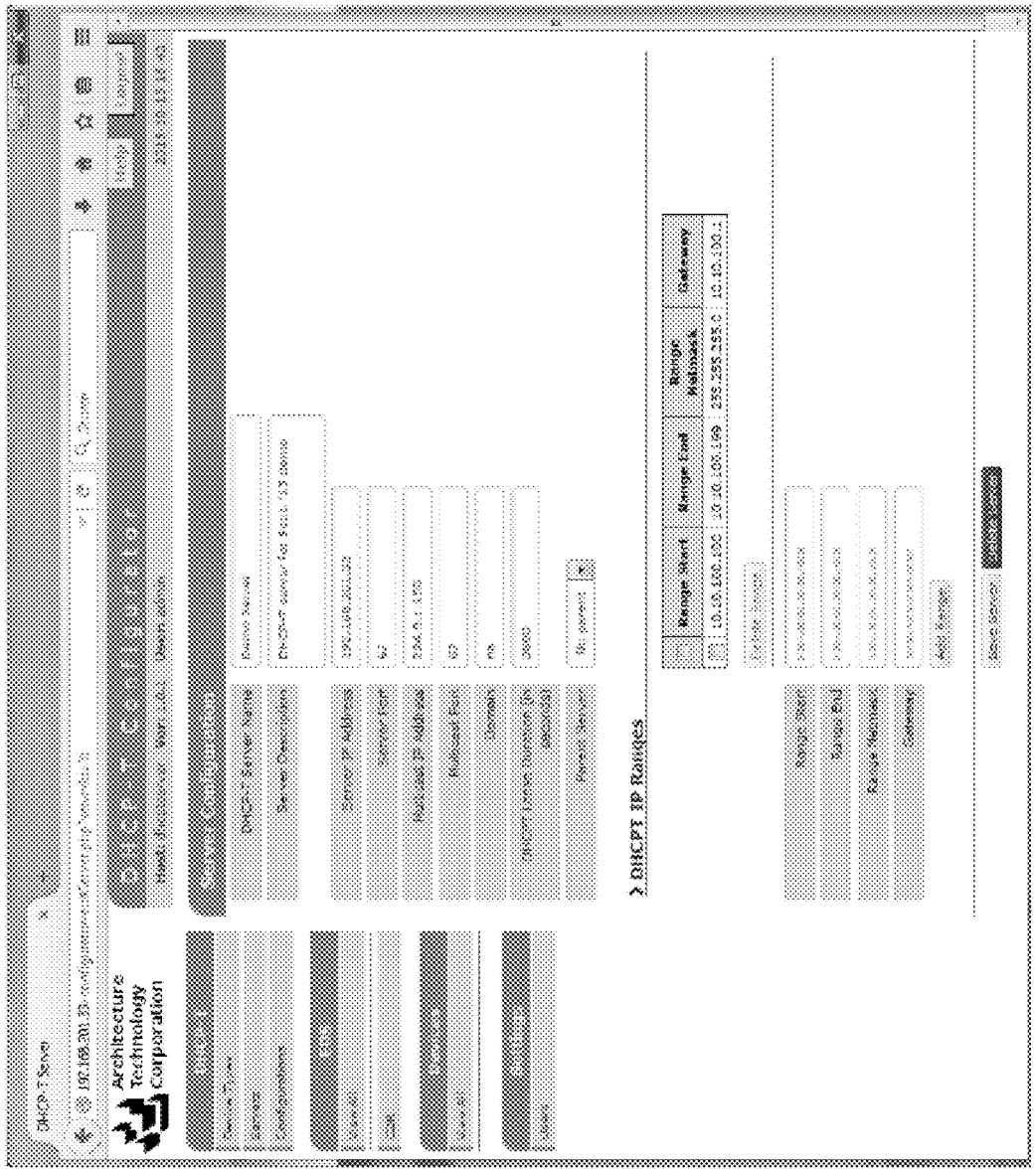

FIG. 4A-4L illustrate example interfaces by which network administrators 11 may configure the network devices 14 and the functionality of configuration computing system 10 and network devices 14, in various aspects of the disclosure. For example, configuration interface 18 of configuration computing system 10 may present an interface by which network administrators 11 may specify the configuration of configuration computing systems 10 and network devices 14, including configuration data 16 sent to network devices 14, how the configuration data 16 is obtained from a data store 40, and how the network devices 14 may handle the configuration data 16 according to the platform type hosting the network device 14. More specifically, configuration interface 18 of configuration computing system 10 may present an interface by which network administrators 11 may add, delete, and/or edit one or more configuration computing systems 10, as shown in FIG. 4A. Network administrators 11 may configure data associated with the configuration computing system 10, including the name, description, IP address, server port, multicast IP address, multicast port, domain, lease duration, and parent server.

The IP address may be the address for which the interface of the configuration computing system 10 is running on. The server port may be the user datagram protocol (UDP) port number the configuration computing system 10 uses. The multicast IP address may be an address used to communicate configuration messages 100 through a radio network. Multicast port may be the port number for which configuration computing system 10 uses for multicasting. Network administrators 11 may further define with the interface the IP ranges associated with configuration computing system 10, including the starting range IP address, the ending range IP address, the netmask, and gateway. The IP ranges may be defined to enable configuration of network devices 14 and may not enable configuration of network devices 14 outside of the defined IP ranges.

Figure 4B:
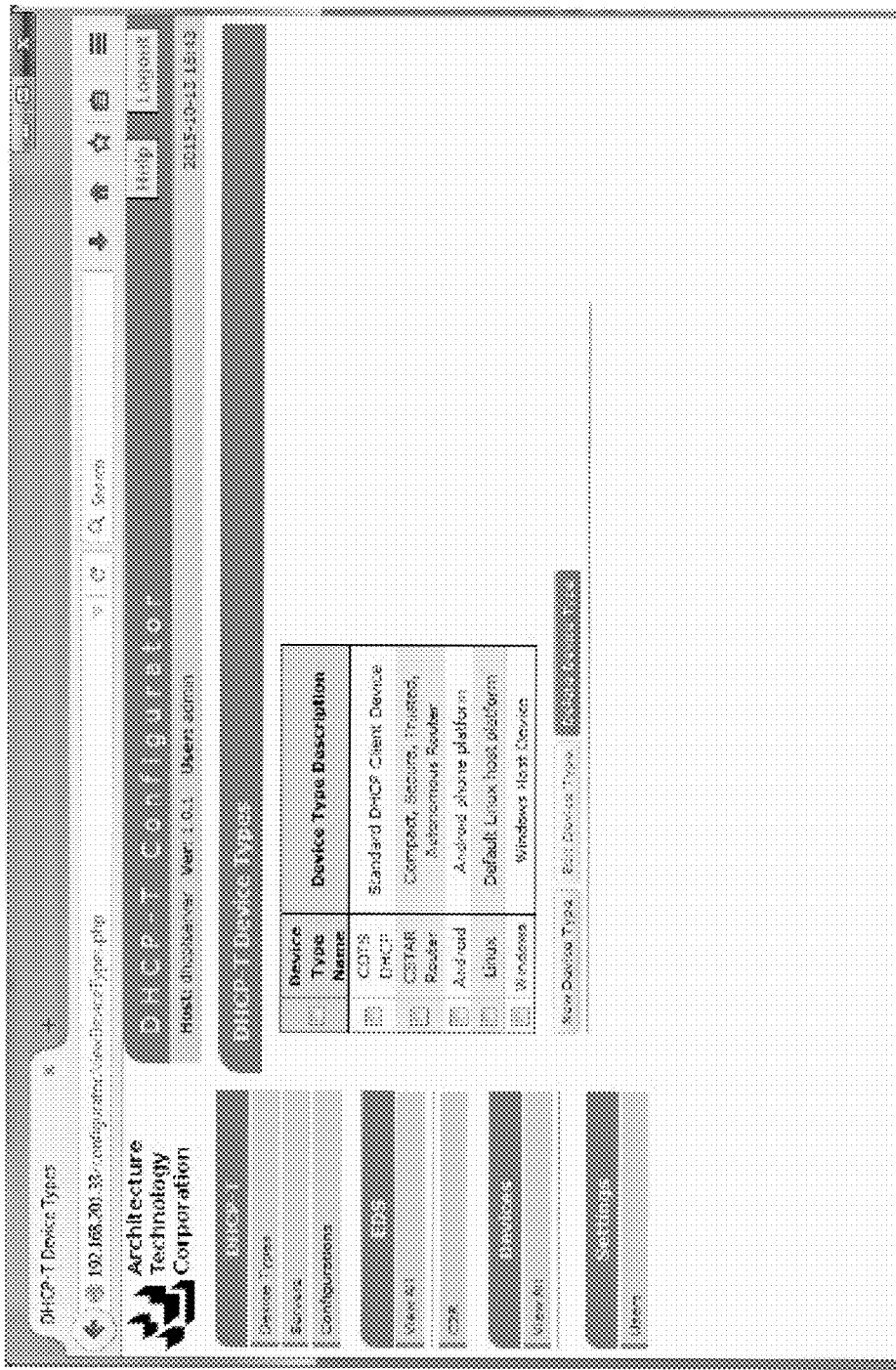
Figure 4C:
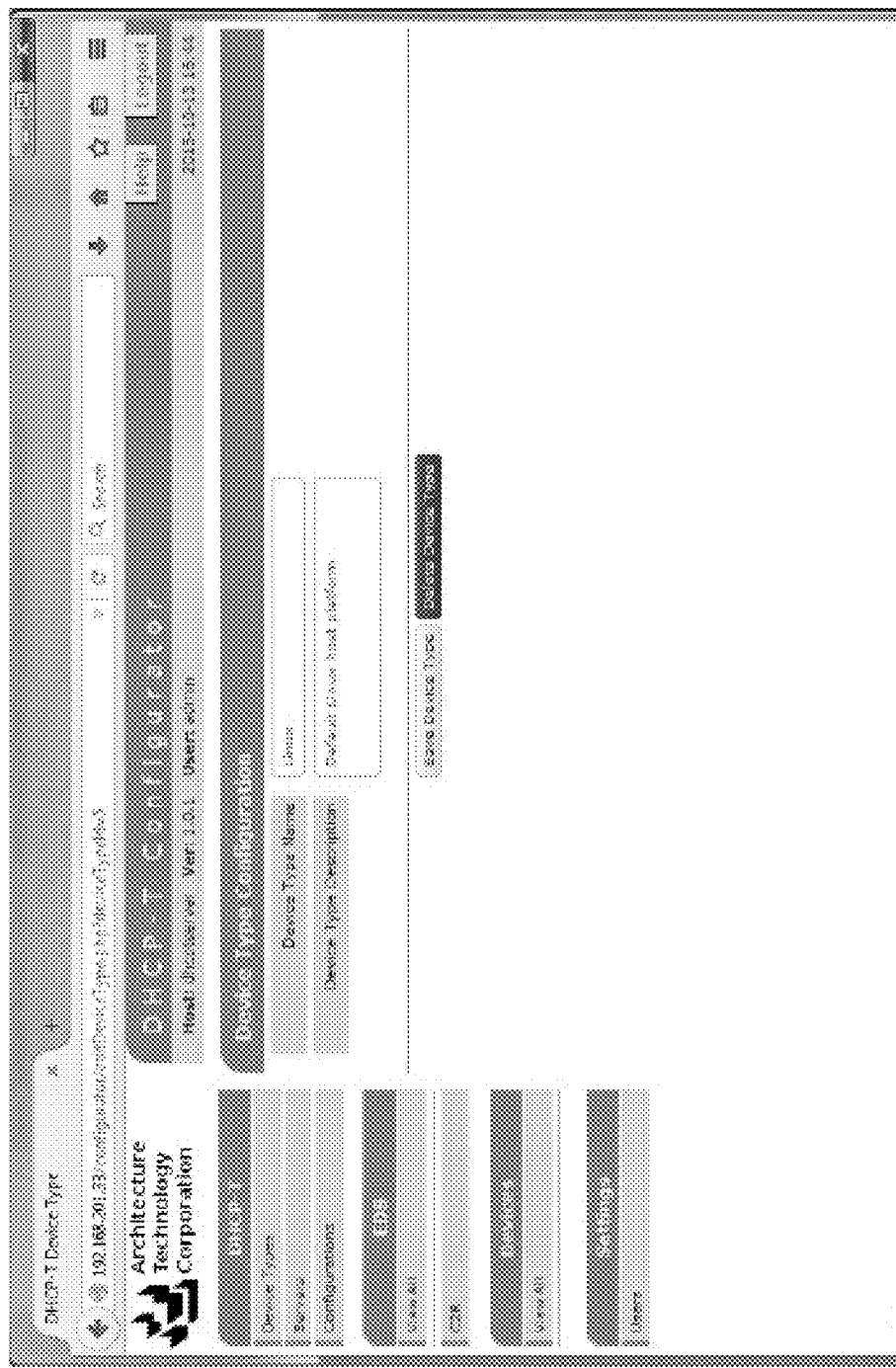

FIGS. 4B and 4C illustrate example interfaces by which network administrators 11 may add, delete, and/or edit a network device 14 for configuration. For example, configuration interface 18 of configuration computing system 10 may present a user interface by which network administrators 11 may define the name and description of the network device 14 for configuration by configuration computing system 10.

Figure 4D:
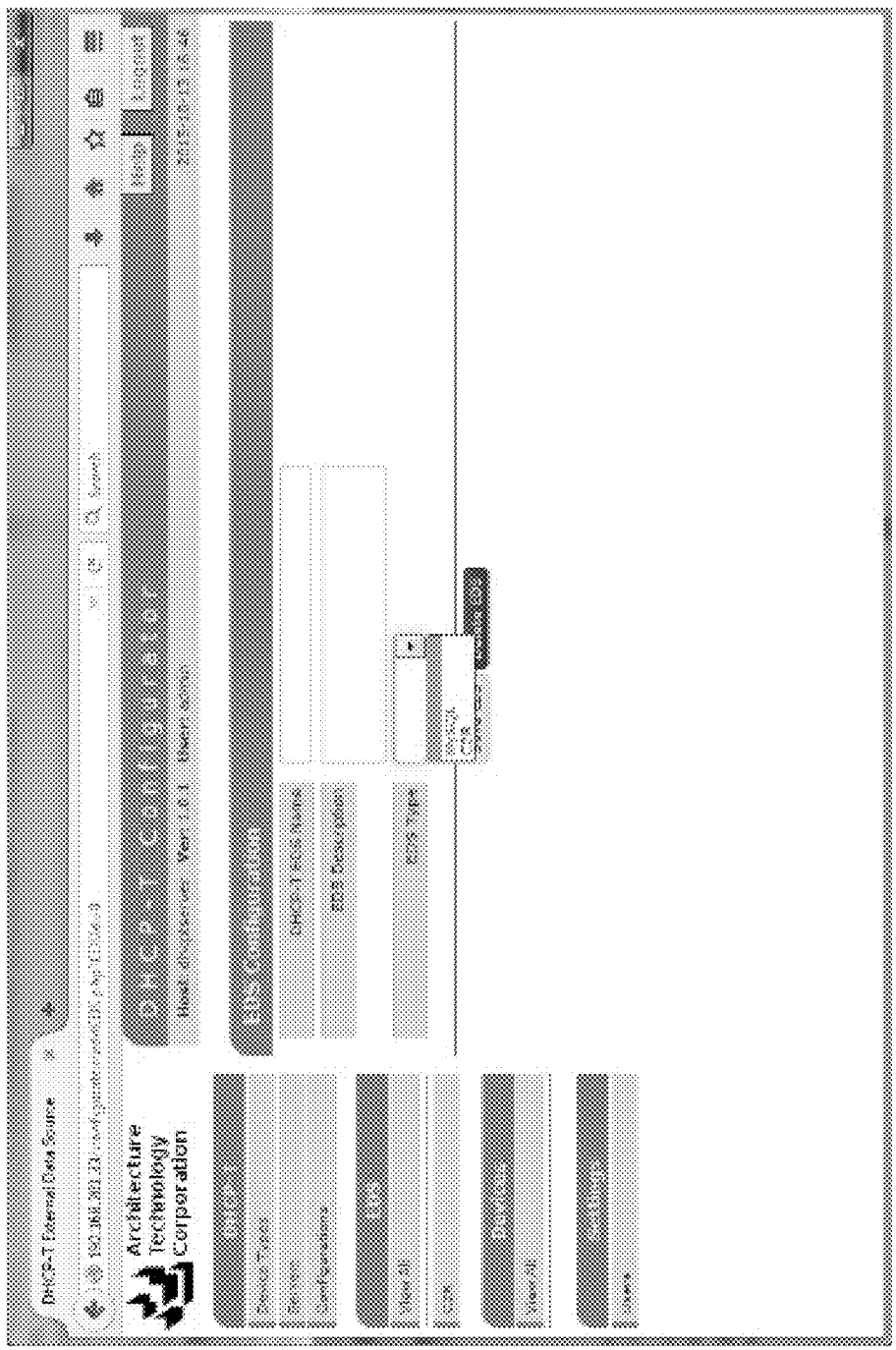
Figure 4E:
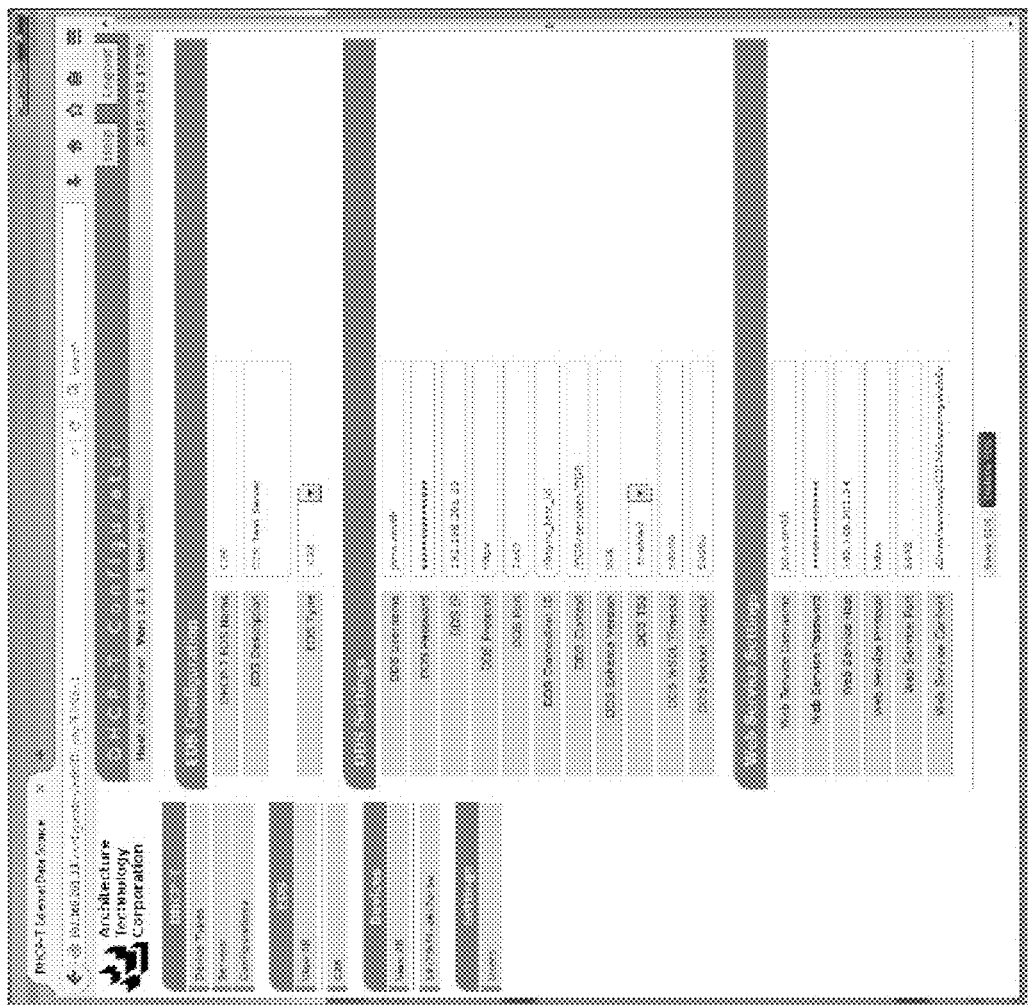
Figure 4F:
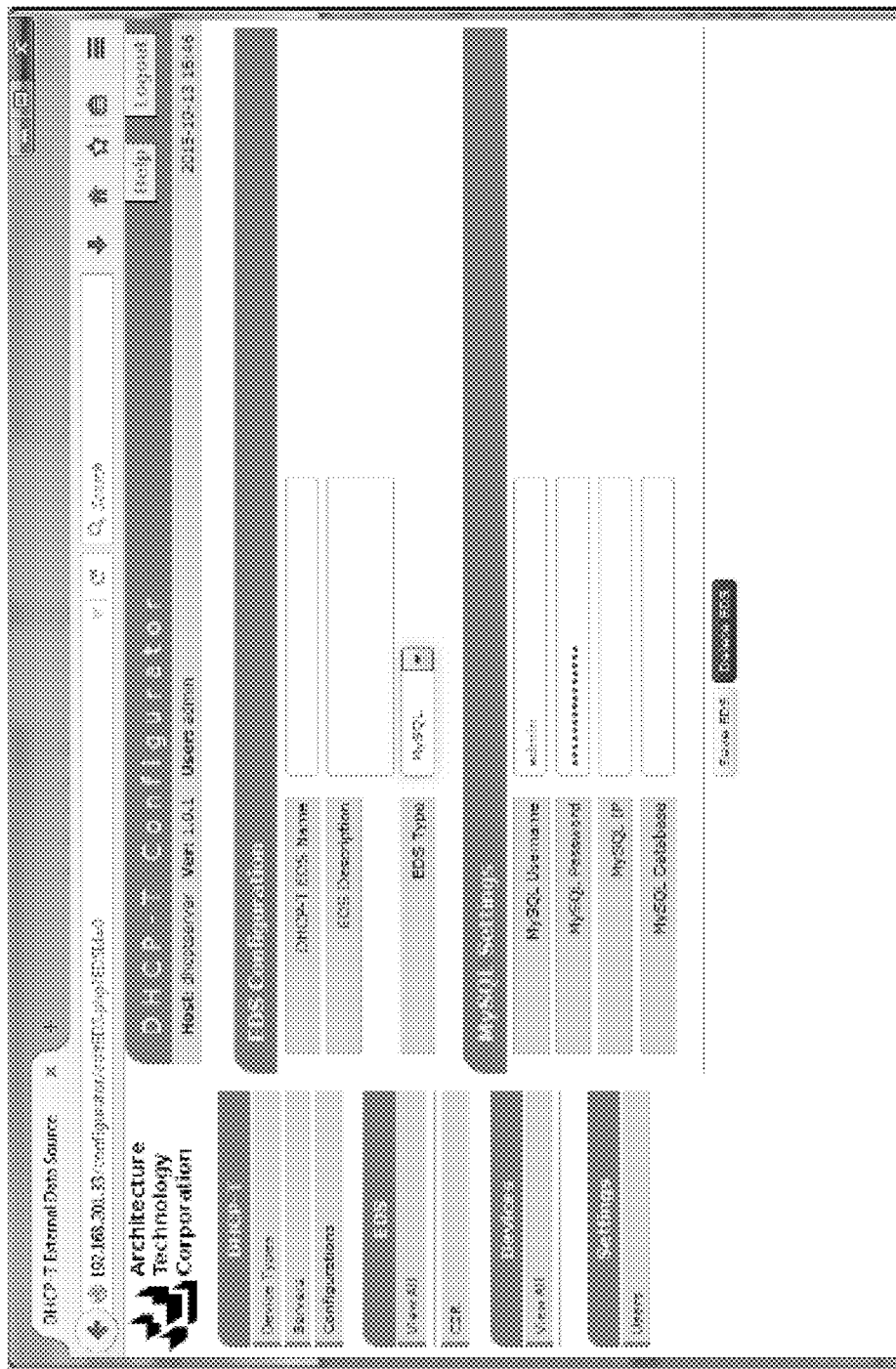
Figure 4G:
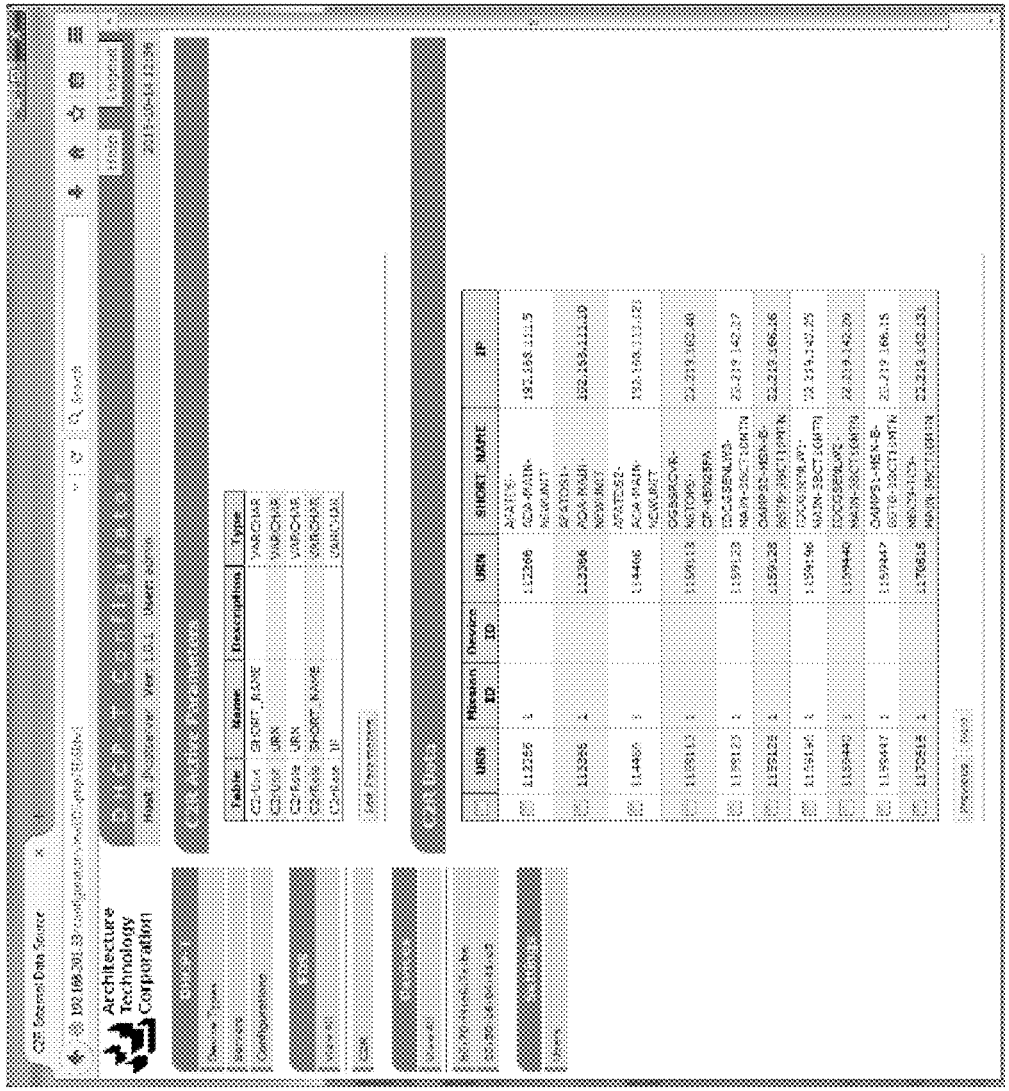
Figure 4H:
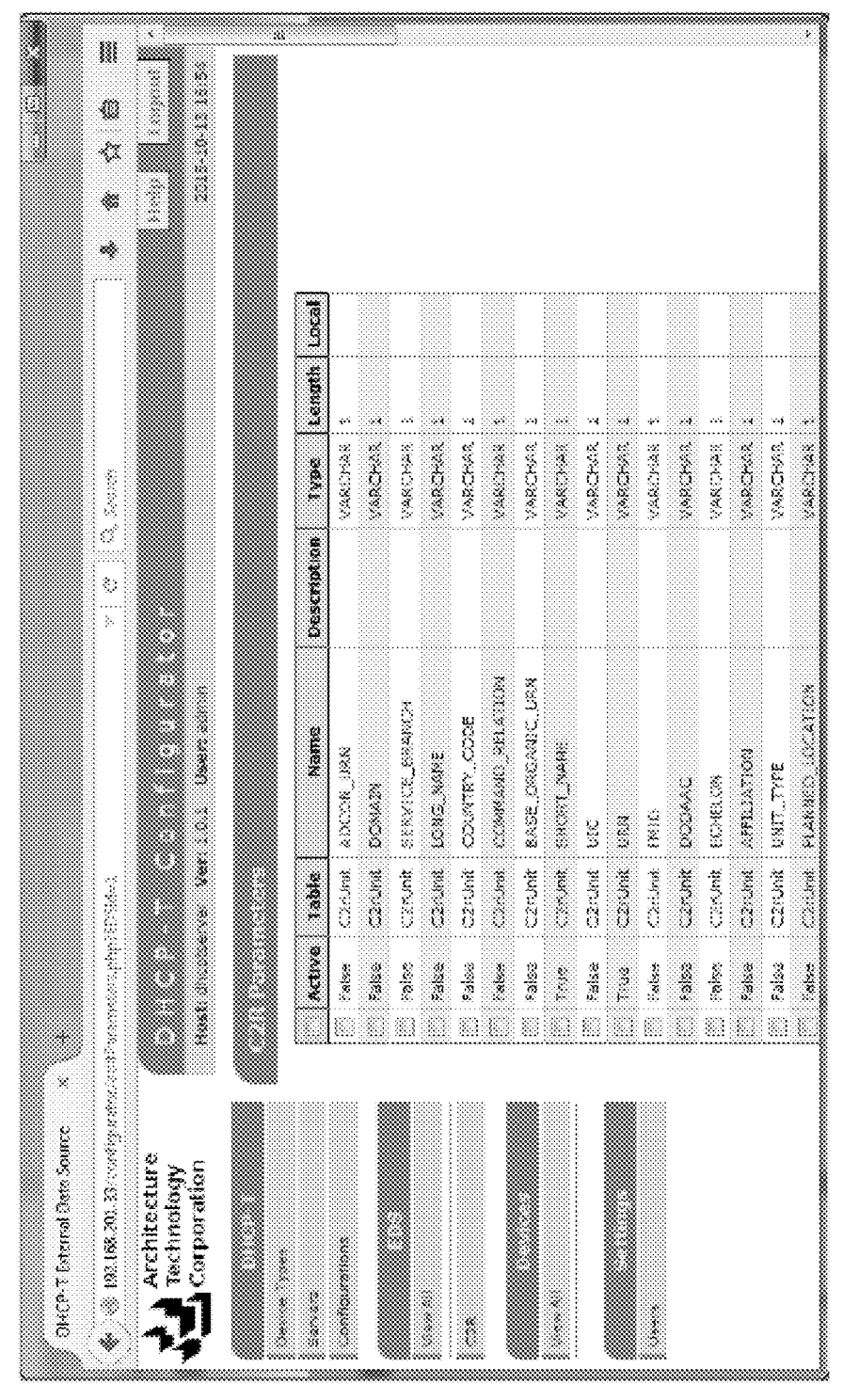

FIGS. 4D-4G illustrate example interfaces by which network administrators 11 may add, delete, and/or edit a data source 40, to indicate the method to access the configuration data 16, and to specify the parameters to be used in the initialization and reconfiguration of network devices 14. In one instance, configuration interface 18 of configuration computing system 10 may present a user interface by which network administrators 11 may define properties of the data source 40, including the name, description, and type of data source (e.g., C2R, My SQL, etc.), as shown in FIG. 4D. In the example interfaces of FIGS. 4E and 4F, network administrators 11 may also define properties of each of the data sources 40, including Data. Description Specifications settings (e.g., username, password, Internet Protocol (IP), protocol, port, connection ID, context, schema version, Web Service Definition Language timeout, socket timeout) and web service settings (e.g., username, password, host, protocol, port, context), or MySQL settings (e.g., username, password, IP, database), depending on the data sources 40 type. FIG. 4G illustrates another example interface by which network administrators 11 may view and edit parameters for each of the data sources 40. In one instance, the interface of FIG. 4G may display C2R data, including the URN, Mission ID, Device ID, name, and IP address. Network administrators 11 may then modify the parameters of each of the data sources 40 to add or delete configuration parameters, as shown in FIG. 4H.

Figure 4I:
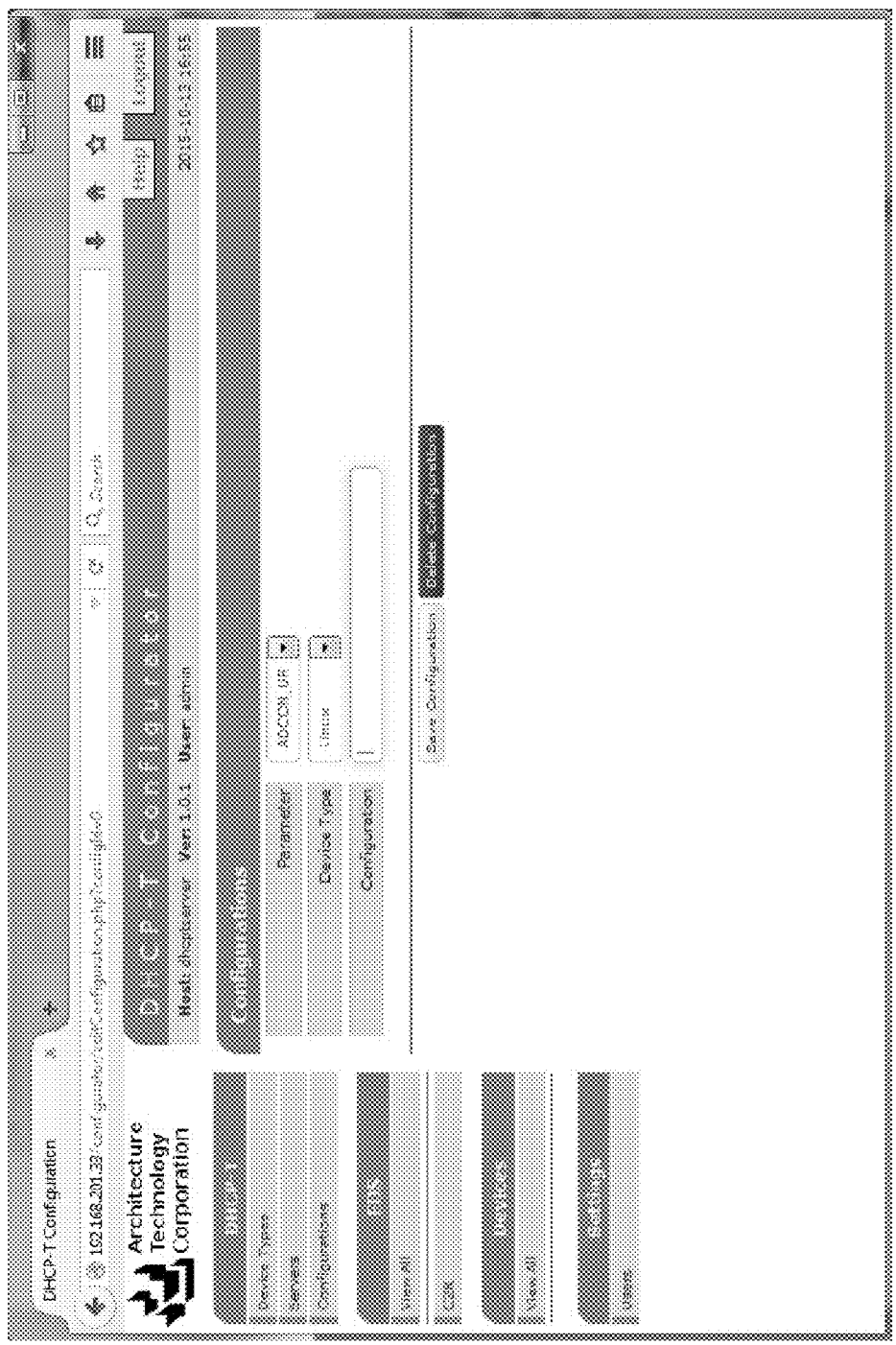

FIG. 4I illustrates an example interface by which network administrators 11 may add, delete, and/or edit configuration parameters for each of network devices 14. In one example, configuration interface 18 of configuration computing system 10 may present an interface by which network administrators 11 may define the parameter to be configured, the device type on which to configure the selected parameter, and the input configuration instructions that will be executed by each of the network devices 14 to configure the selected parameter on the selected type of network devices 14.

Figure 4J:
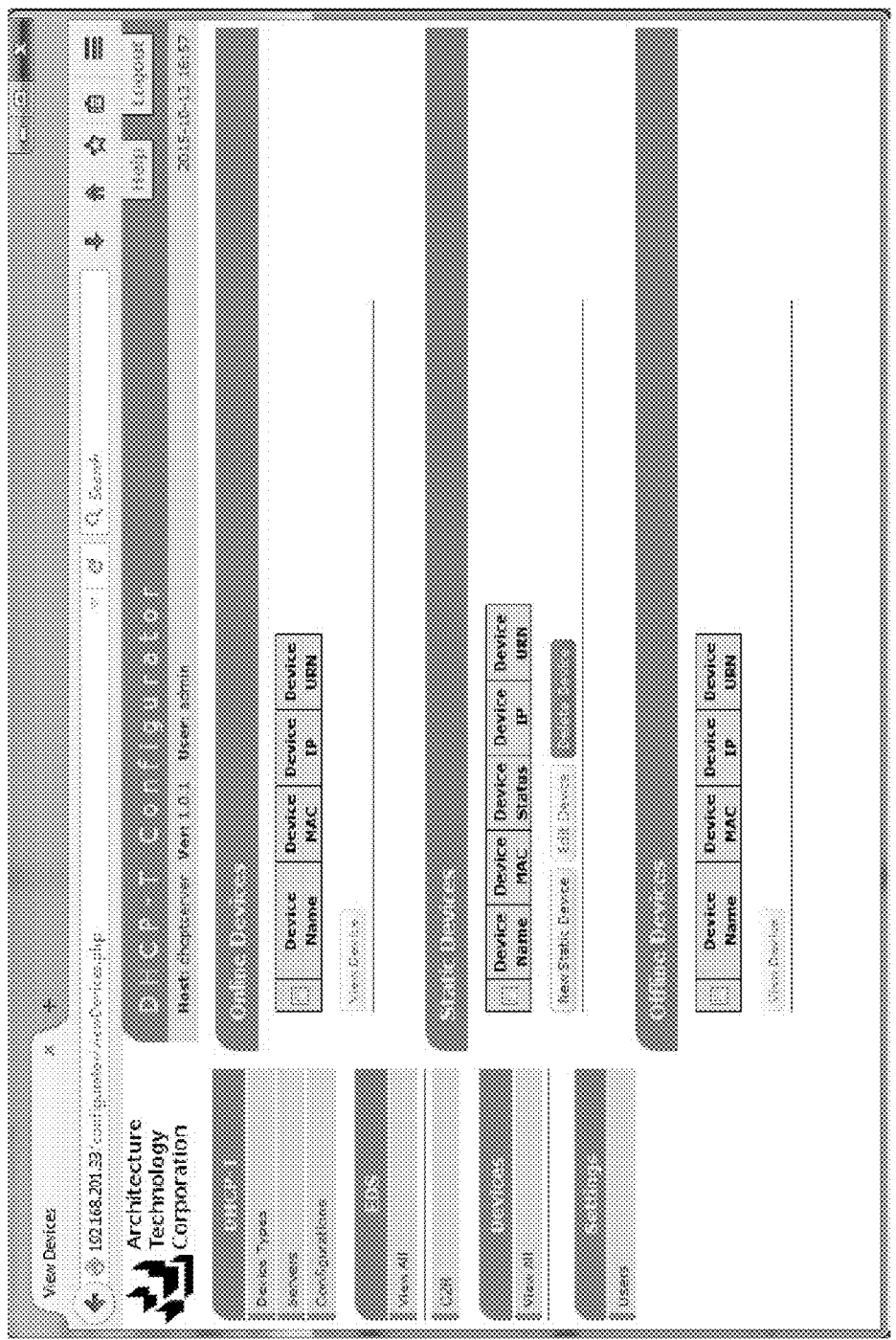

FIG. 4J illustrates an example interface by which network administrators 11 may display each of the network devices 14 that are currently managed by one or more configuration computing systems 10 for automated configuration. In one instance, configuration interface 18 of configuration computing system 10 may display each of the network devices 14 that are online, static, and/or offline.

Figure 4K:
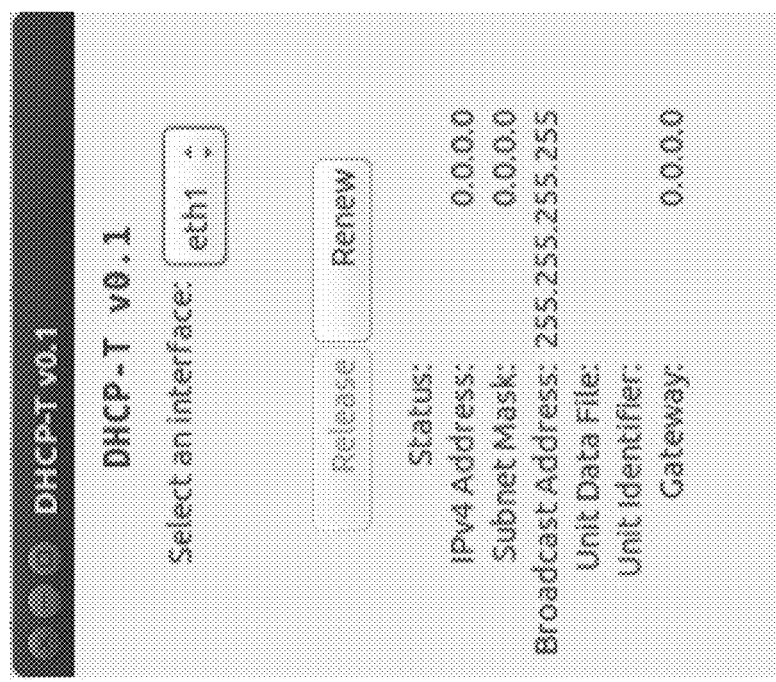
Figure 4L:
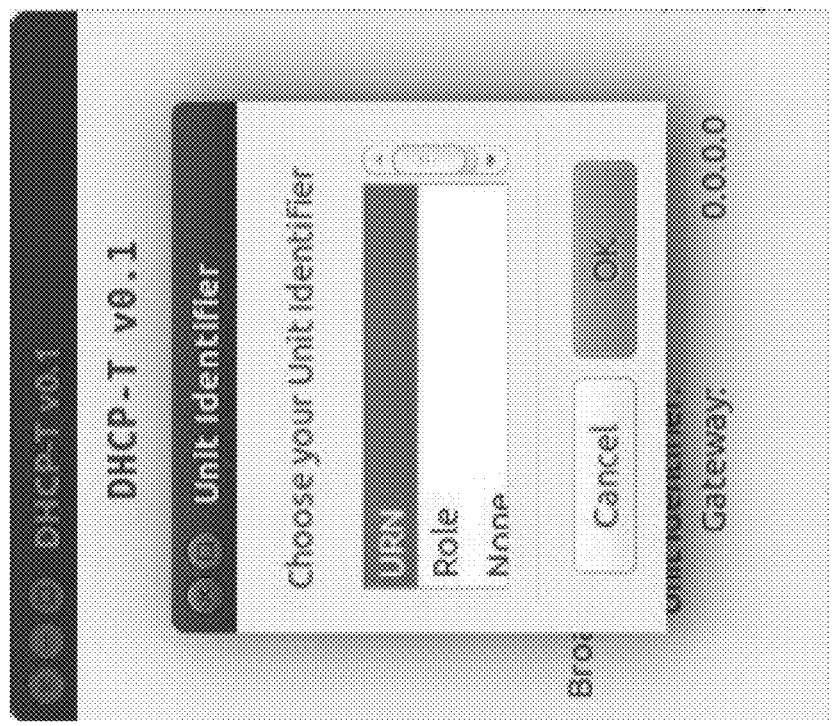

FIGS. 4K and 4L illustrate example network device 14 interfaces. In the example of FIG. 4K, device configuration interface 48 of network devices 14 may present a user interface by which one of network users 4 may select a network interface to configure the network devices 14, and may further define whether to release and/or renew a lease for an IP address from configuration computing systems 10. The interface of FIG. 4K may also display current configuration information for each of the selected network devices 14. In another example, the interface of FIG. 4K may additionally display update/status messages for alerting network users 4 to any problems or when a lease is acquired, renewed, or updated. When network users 4 elect to renew any un-configured network devices 14, the un-configured network devices 14 may present a user interface by which network users 4 may enter information including a client identifier (e.g., URN or a role) that matches the client identifier currently in data source 40, as shown in FIG. 4L. In another example interface of FIG. 4L, network users 4 may choose not to select a client identifier, thereby the network device 14 may perform essentially the same as a commercial off-the-shelf (COTS) DHCP device, as shown in FIG. 4L.

Figure 5:
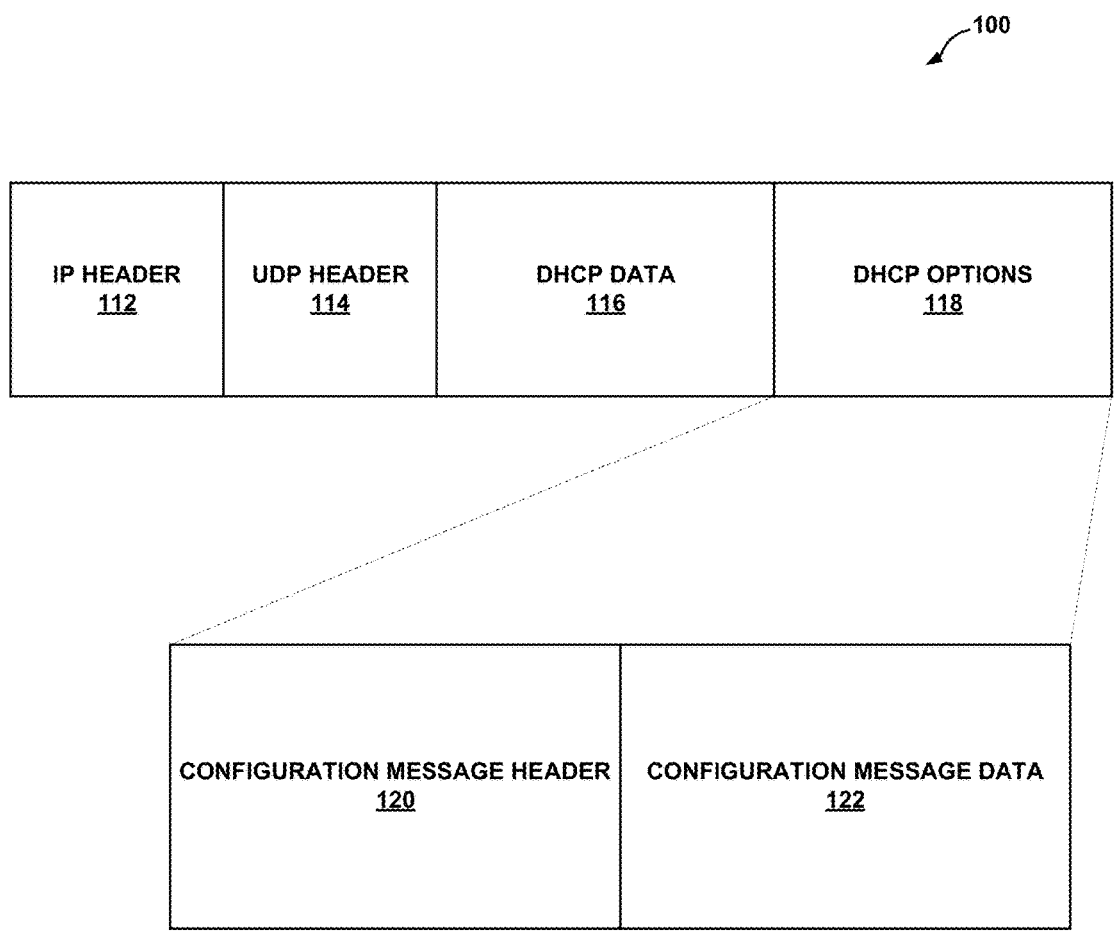
FIG. 5 is a block diagram illustrating an example configuration message, in accordance with one or more aspects of the present disclosure.

FIG. 5 is a block diagram illustrating an example configuration message 100, in accordance with one or more aspects of the present disclosure. In one example, messaging module 22 of the configuration computing system 10 and device messaging module 44 of the network device may generate one or more configuration messages 100 that may also include augmented dynamic host configuration protocol (DHCP) messages and functions with mission-specific configuration parameters to communicate between configuration computing systems 10 and network devices 14. Traditional DHCP messages and functions consist of an IP header 112, a User Datagram Protocol (UDP) header 114, a DHCP data 116, and a DHCP options 118 fields. Configuration messages 100 within the DHCP-T process may function as a message tag by augmenting the DHCP options 118 field to further include a configuration message header 120 and a configuration message data field 122. Configuration message header 120 may include one or more flag bits that may operate as a message tagging scheme for configuration computing systems 10 and network devices 14 to distinguish DHCP-T messages from standard DHCP messages. For example, an augmented DHCP options 118 field may include a configuration message header 120 field and a configuration message data 122 field of the respective DHCP configuration message. The structure of the configuration message header field 120 and configuration message data 122 field may be standardized across all augmented DHCP configuration messages. In one instance, the configuration message header 120 field may comprise of flag bits that include one or more predefined bits that may operate as an indicator for configuration computing systems 10 and network devices 14 to determine that the DHCP data packet includes an augmented DHCP options 118 field. In another instance, configuration message data 122 may include configuration data 16 stored in data source 40, such as mission-specific configuration parameters (e.g., roles, URN, IP address, mission related data) Configuration message data 122 may include one or more configuration data bits for communicating the configuration message data 122 from configuration computing systems 10 to network devices 14. The configuration computing system 10 and network devices 14 may communicate with augmented DHCP messages using current DHCP standards and may enable automated initialization and configuration of mission command systems to support tactical network initialization and unit task reorganization. By standardizing the structure of the DHCP options 118 field, configuration computing systems 10 and network devices 14 may distinguish augmented DHCP configuration messages from standard DHCP messages.

Figure 6:
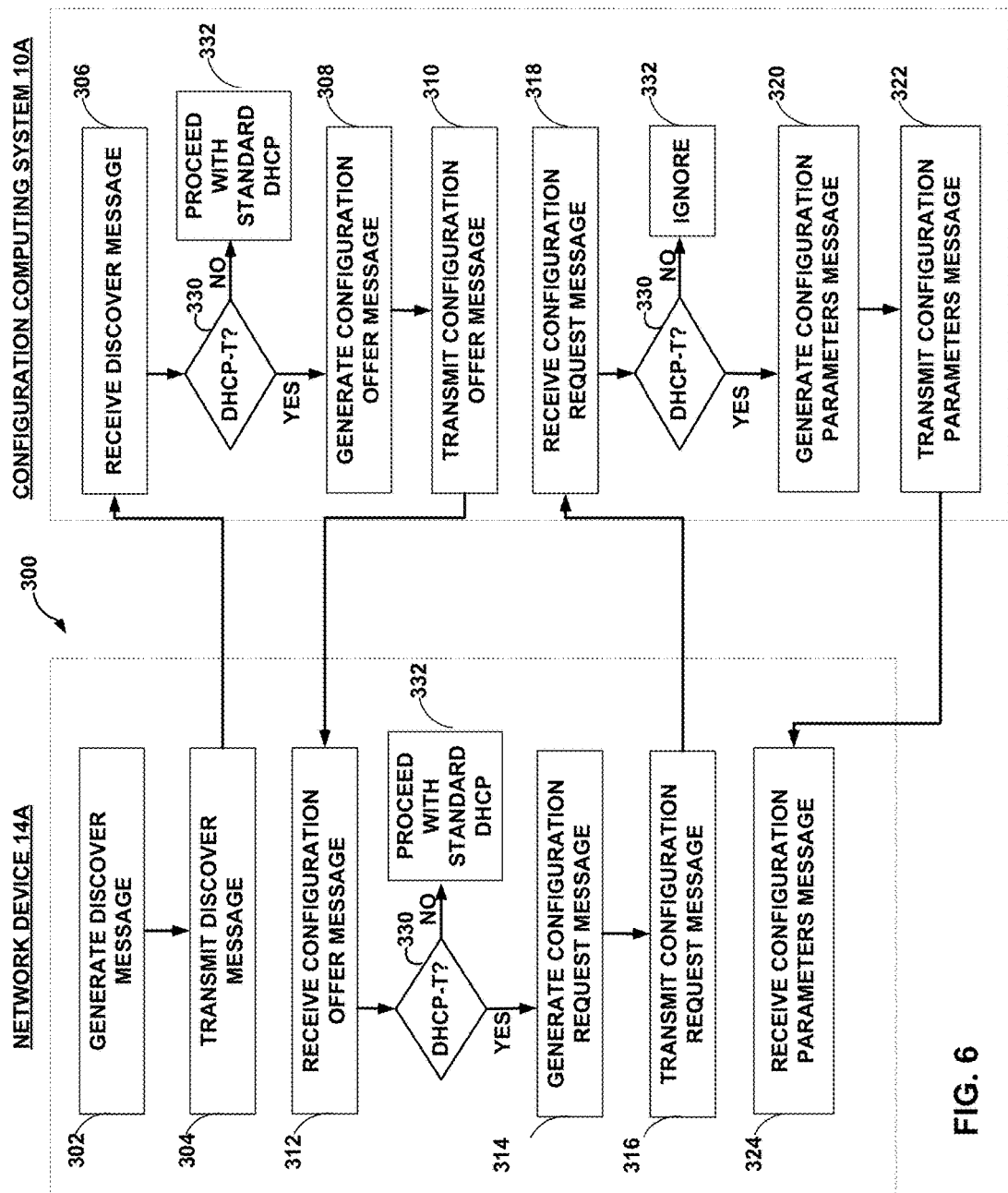
FIG. 6 is a flow diagram illustrating an example configuration method, in accordance with one or more aspects of the present disclosure.

FIG. 6 is a flow diagram illustrating an example configuration method 300, in one aspect of the disclosure. In one example, each of network users 4 may request configuration from the configuration computing systems 10 to initialize, configure, and/or re-configure network devices 14. For example, network device 14A, which is a non-limiting example of one of network devices 14, may begin with generating one or more configuration messages 100 with device messaging module 44 that may include a discover message (302). The discover message may include an augmented DHCP message for finding a configuration computing system 10A in a DHCP-T system and to initiate a configuration and/or reconfiguration of a network device 14A. Network device 14A may transmit the discover message to the configuration computing system 10A (304). Configuration computing system 10A may then receive the discover message (306). Upon reception of the discover message, configuration computing system 10A may use the messaging module 22 to differentiate an augmented DHCP message (e.g., a DHCP-T message) from a standard DHCP message (330) by examining the DHCP options field of a DHCP packet.

If the discover message does not include an augmented DHCP message, such as the absence of a configuration message header 120 field and a configuration message data 122 field, the configuration computing system 10A may proceed according to the standard DHCP protocol (to make DHCP-T backward compatible) (332) because it is a standard DHCP message. If the discover message includes an augmented DHCP message, such as the presence of a configuration message header 120 field and a configuration message data 122 field, configuration computing system 10A may proceed with the configuration and/or reconfiguration process according to the DHCP-T process, and may generate a configuration offer message with an offer of configuration parameters, such as an to offer to lease a respective Internet Protocol address (308). The configuration offer message may also comprise an augmented DHCP message. Configuration computing system 10A may then transmit the configuration offer message to the network device 14 (310). Configuration computing system 10A may also send the configuration offer message to require additional parameters associated with the network device 14A (e.g., a list of possible log-in roles) to be specified by network users 4. In particular, specifying a log-in role associated with the network device 14A may enable the configuration computing system 10A to determine the configuration data 16 associated with the role from one or more data sources 40. Network device 14A may receive the configuration offer message (312) and may identify, with the device messaging module 44, that the configuration offer message comprises an augmented DHCP message and will accept the message from the configuration computing system 10A (330). Network device 14A may ignore messages without an augmented DHCP message and may proceed according to the standard DHCP protocol (332).

In response to determining that the configuration offer message includes an augmented DHCP message, network device 14A may generate a response message that includes a configuration request message with device messaging module 44 for requesting configuration data 16 from the configuration computing system 10A (314). In one example, network device 14A may include a client identifier (e.g., log-in role) from a designation location on the network device 14A in the configuration request message. The configuration computing system 10A may use the client identifier to obtain the latest configuration data 16 uniquely associated with the client identifier from data source 40. In an alternative example, if the data source 40 is unavailable, the configuration computing system 10A may use configuration data 16 stored in the configuration database 50 to transmit to the network device 14A.

Network device 14A may then transmit the configuration request message to configuration computing system 10A (316) to request configuration data 16 based on the offer from the configuration computing system 10A. Transmission of the configuration request message may inform configuration computing system 10A that network device 14A requests configuration data 16 from configuration computing system 10A and not from other computing systems, such as standard DHCP servers. Configuration computing system 10A may then receive the configuration request message from the network device 14A (318). By determining that the configuration request message includes an augmented DHCP message (330), messaging module 22 of configuration computing system 10A may then generate a configuration parameters message with configuration data 16 (e.g., roles, URN, IP address, mission related data) acknowledging the request from network device 14A, including additional data for initializing and reconfiguring network devices 14A (320). Configuration computing system 10A may interface with modular interface adapter 30 to retrieve configuration data 16 from a data source 40 for configuration of network device 14A, which will be described herein. Configuration computing system 10A may then transmit the configuration parameters message with configuration data 16 as an augmented DHCP message to the network device 14A (322). Network device 14A may then receive the configuration parameters message with configuration data 16 (324) from the data source 40 and begin configuration or reconfiguration of the network device 14A.

Figure 7:
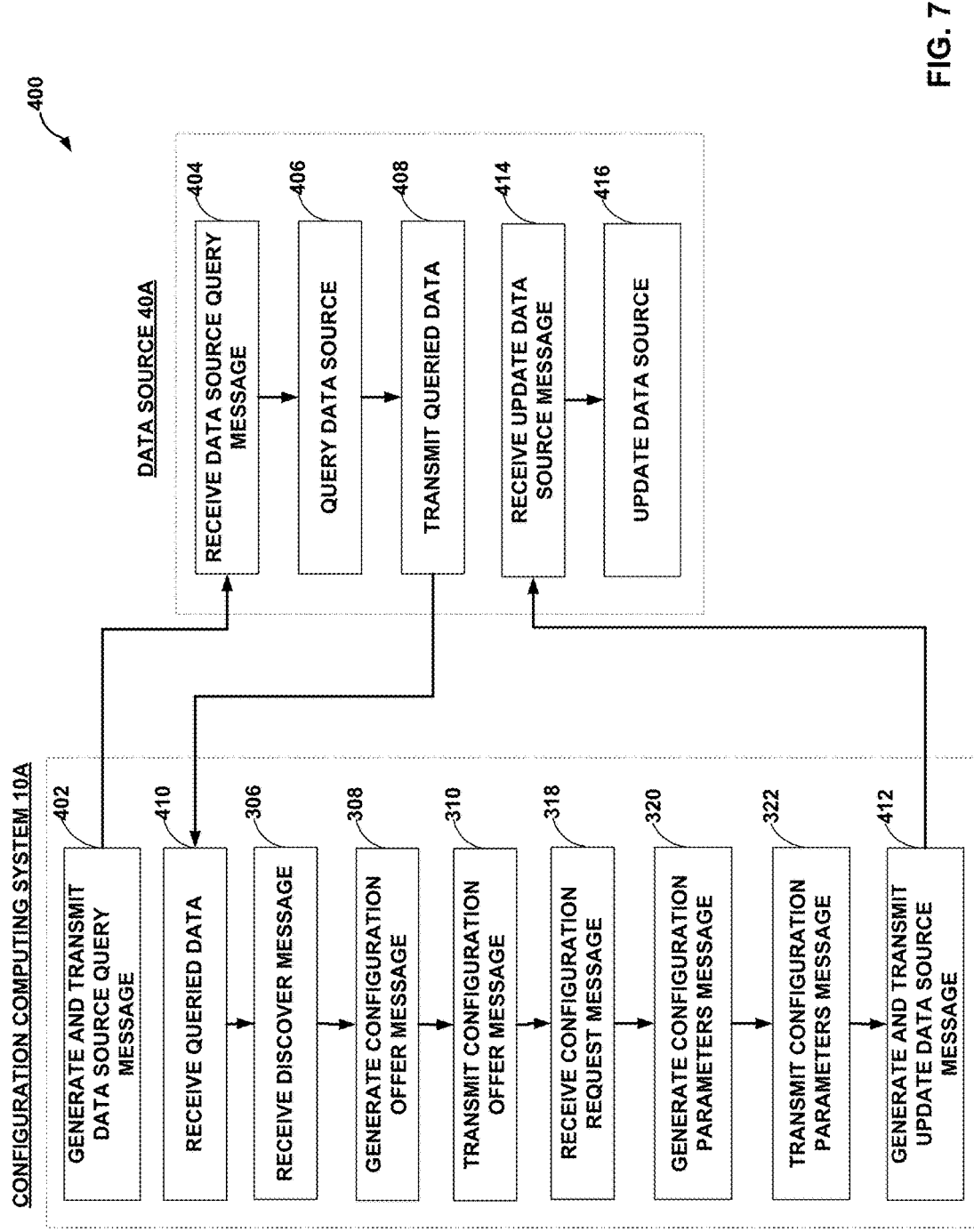
FIG. 7 is a flow diagram illustrating an example querying method, in accordance with one or more aspects of the present disclosure.

FIG. 7 is a flow diagram illustrating an example querying method 400 in communication with one example of the one or more data sources 40, in accordance with one or more aspects of the present disclosure. For each of the configuration computing systems 10 to provide configuration data 16 to network devices 14, each of the configuration computing systems 10 may use a modular interface adapter 30 to retrieve and store configuration data 16 in data sources 40. For example, the modular interface adapter 30 of configuration computing system 10A may generate and transmit a data source query message (402) to obtain configuration data 16 from data source 40A. Data source 40A may then receive the data source query message (404) from the configuration computing system 10A. The data source 40A may then query the data source (406) to retrieve configuration data 16 stored in data source 40A, such as querying for configuration data 16 associated with network devices 14, including an IP address, a URN, role names, and/or missions. In one example, a C2R data source may use C2R specific commands, such as QUERY_ROLES and/or QUERY_UNITS, generated from the modular interface adapter 30 to query roles and/or units associated with one or more of the network devices 14 from the C2R data source. In another example, the configuration computing system 10A may store the queried data in configuration database 50. Data source 40A may then transmit the queried configuration data 16 to the configuration computing system 10A so that configuration computing system 10A may transmit the queried configuration data 16 to network devices 14 for initialization and configuration.

The configuration computing system 10A may further include instructions to update the data source 40A with updated configuration data 16 associated with network devices 14. For example, the configuration computing system 10A may use modular interface adapter 30 to generate and transmit an update data source message (412) to update the data source 40A with the current configuration data 16 associated with network devices 14. Data source 40A may receive the update data source message (414) from the configuration computing system 10A. Data source 40A may then update data source 40A with configuration data 16 associated with network devices 14. In one example, a C2R data source may be use C2R specific commands, such as UPDATE_ROLES and/or UPDATE_UNITS to update the role and units associated with network devices 14.

Figure 8:
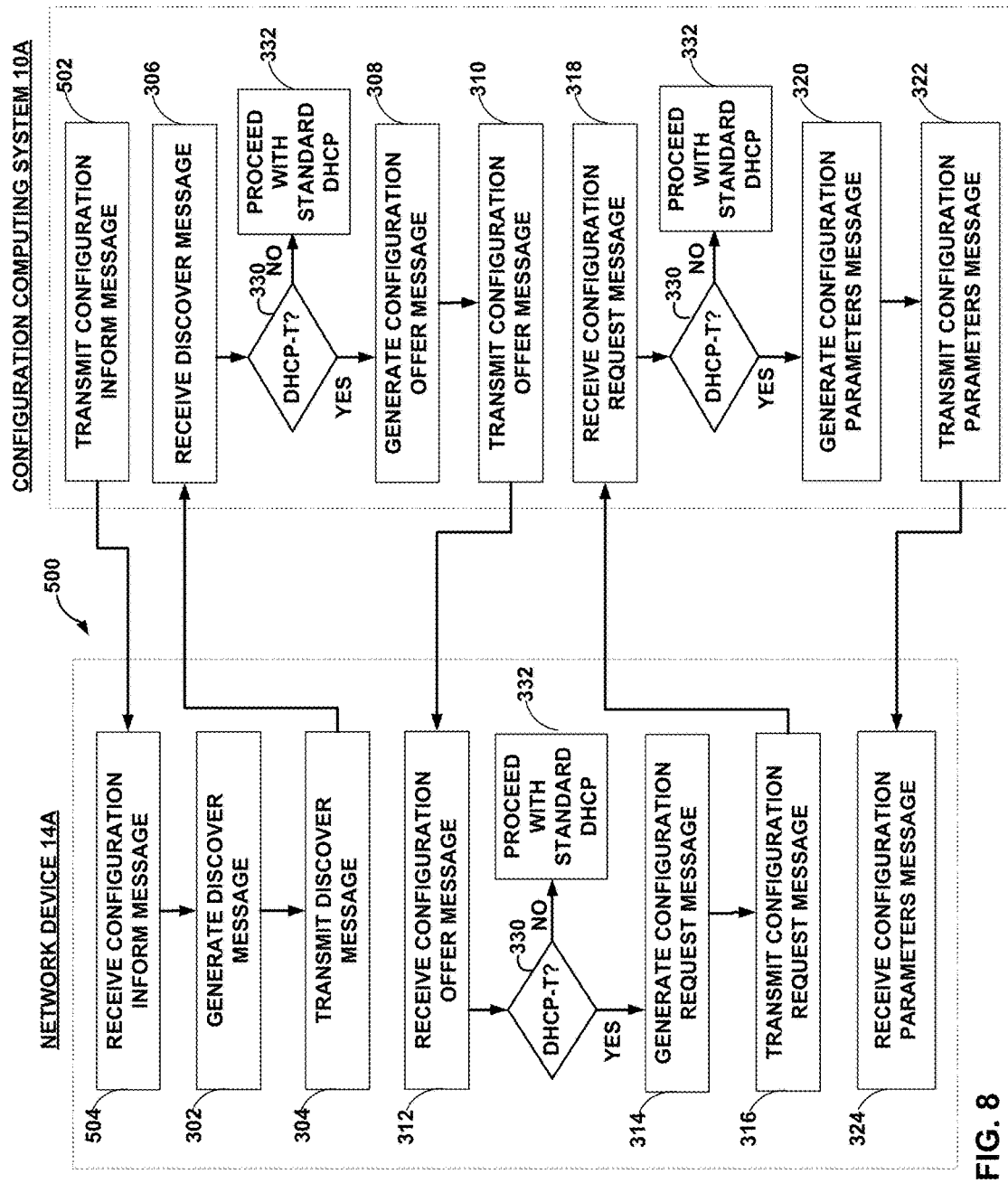
FIG. 8 is a flow diagram illustrating another example configuration method, in accordance with one or more aspects of the present disclosure.

FIG. 8 is a flow diagram illustrating another example configuration method 500, in accordance with one or more aspects of the disclosure. Configuration method 500 of FIG. 8 is similar to configuration method 300 of FIG. 6, except as described below. More specifically, configuration computing system 10 may initiate the configuration of the one or more network devices 14 rather than being initiated by the network devices 14. The configuration computing system 10 may use messaging module 44 to generate a configuration inform message for initiating the configuration of the one or more network devices 14. In one instance, data source 40 may include new or updated configuration data 16 for configuration and/or reconfiguration of the network devices 14. The configuration computing system 10 may then transmit the configuration inform message with an augmented DHCP message to the network devices 14 (502) to inform the network device 14 to initiate the configuration and/or reconfiguration. Upon receiving the configuration inform message (504), the network devices 14 may initiate configuration method 300. Configuration method 500 allows configuration computing system 10 to automate the configuration of network devices 14 with new mission changes (e.g., Unit Task Reorganization to reassign a company and organize it under a new battalion) without manual initialization procedures.

Figure 9:
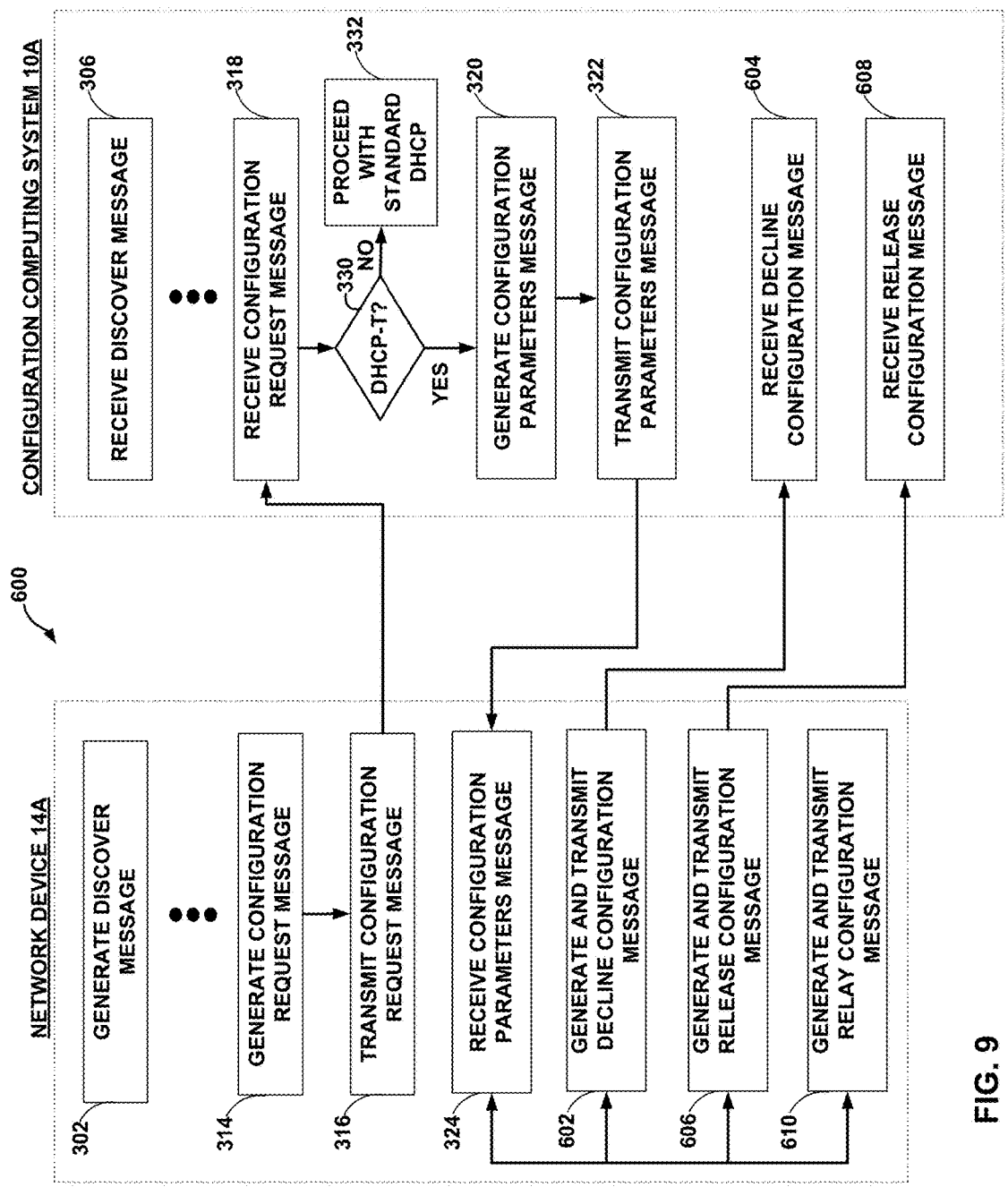
FIG. 9 is a flow diagram illustrating another example configuration method, in accordance with one or more aspects of the present disclosure.

FIG. 9 illustrates a flow diagram illustrating another example configuration method 600, in accordance with one or more aspects of the disclosure. Configuration method 600 of FIG. 9 is similar to configuration method 300 of FIG. 6, except as described below. More specifically, network devices 14 may generate and transmit a response message to decline or release the configuration from the configuration computing system 10. For example, network device 14 may, upon receiving the configuration parameters message (324), generate (with device messaging module 44) and transmit a decline configuration message (602) for informing the configuration computing system 10 that the suggested network address from configuration data 16 is invalid and already in use or in conflict with other configuration data 16. The configuration computing system 10 may receive the decline configuration message (604), which may cause network devices 14 to restart the configuration process again. Network device 14 may also, upon receiving the configuration parameters message (324), generate (with device messaging module 44) and transmit a release configuration message (606) for relinquishing an IP address configured by configuration computing system 10, and may cancel the remaining lease on an IP address, or remove other configuration data 16. Configuration computing system 10 may receive the release configuration message (608) and cancel any remaining lease on a network device 14. In another example, network device 14 may further generate (with device messaging module 44) and transmit a relay configuration message (610) to broadcast and facilitate relay-agent election in a subnet in various connection scenarios described herein.

Figure 10:
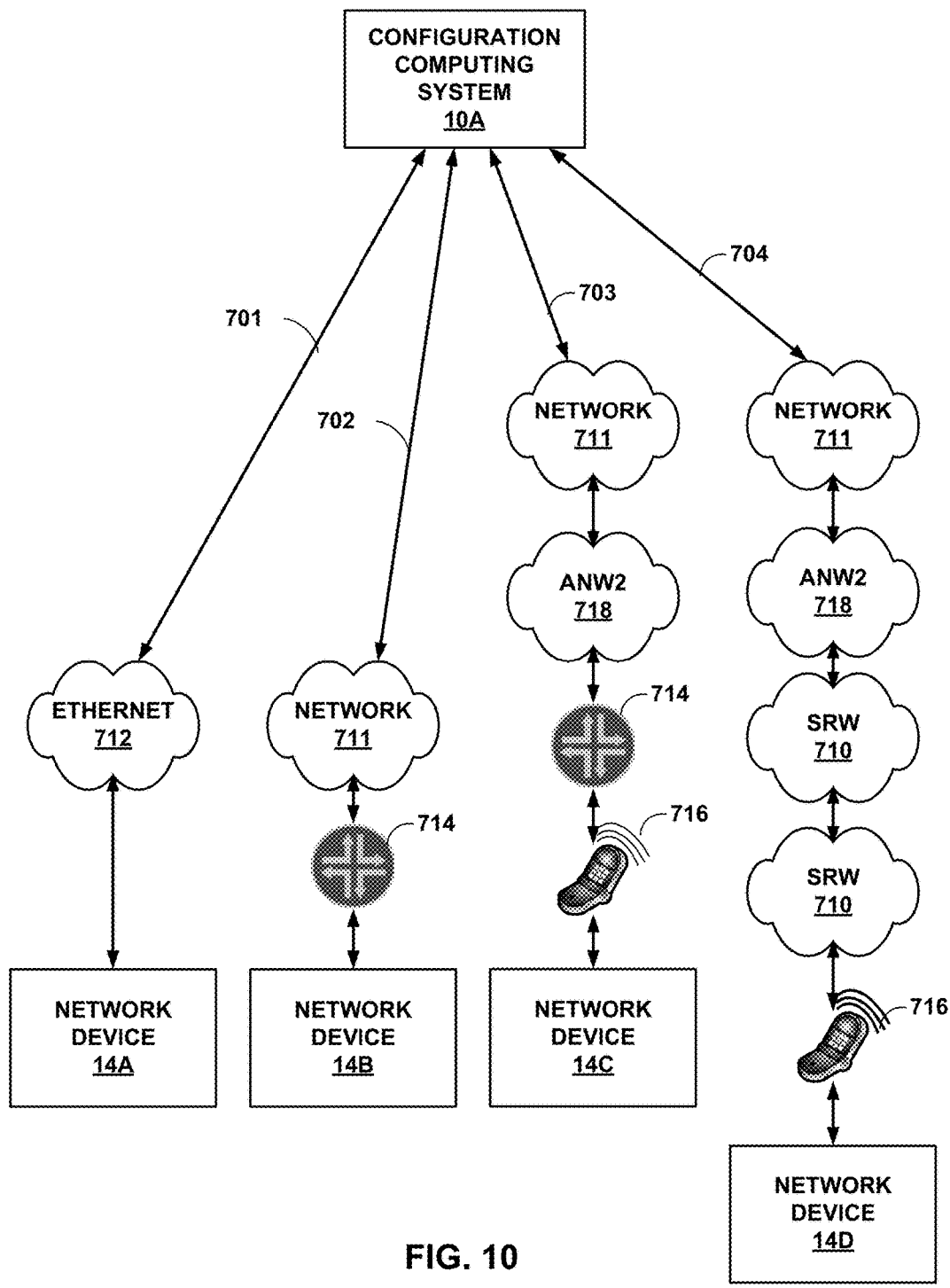
FIG. 10 is a block diagram illustrating examples of various connection scenarios for configuration of network devices, in accordance with one or more aspects of the present disclosure.

FIG. 10 is a block diagram illustrating examples of various network 12 connection scenarios for the configuration of network devices 14. The DHCP-T process may configure and/or reconfigure network devices 14 in various connection scenarios with a configuration computing system 10. The various connection scenarios may include the same network segment 701, a multiple network segment 702 with a commercial of-the-shelf (COTS) router in the client's subnet, a multiple network segment 703 with a tactical radio through a COTS router, and a multiple radio network segment 704 with multiple radio networks where the network device 14D is connected directly to a tactical radio network.

In one example, configuration computing system 10A may be connected to network device 14A through an Ethernet network 712. This may establish a same network segment 701 between the configuration computing system 10A and to network device 14A. A connection with the same network segment may allow configuration computing system 10A to receive configuration messages 100 from the network device 14A directly.

In another example, configuration computing system 10A and network device 14B may be connected through multiple network segment 702 via a COTS router 714 and network 711. Network 711 may comprise Wide Area Network (WAN), Metropolitan Area Network (MAN), Personal Area Network (PAN), Virtual Private Network (VPN), Campus Area Network (CAN), Enterprise Private Network, Home area Network, Storage Area Network, and other computer networks. COTS router 714 may be configured to relay standard DHCP messages to a configuration computing system 10A. Because augmented DHCP messages still utilize the DHCP protocol, augmented DHCP messages, such as configuration messages 100, may still be relayed from network device 14B through COTS router 714.

In a scenario where a network device 14C uses a tactical radio 716 (e.g., Harris Falcon III AN/PRC-117G, AN/PRC-152A) through a COTS router 714 to communicate with configuration computing system 10A, the multiple network segment 703 is no different than multiple network segment 702. Existing radios 716 and COTS router 714 may relay the augmented DHCP messages because augmented DHCP messages still utilize the DHCP protocol.

In another example, although tactical radios 716 are generally not configured to relay DHCP messages, network device 14D may initiate communications with configuration computing system 10A through a multiple radio network segment 704 (e.g., Soldier Radio Waveform 710 (SRW) and/or Adaptive Networking Wideband Waveform 718 (ANW2)). If the tactical radio 716 is configured to provide DHCP service, network device 14D may be assigned a temporary IP address automatically by the tactical radio 716, through the standard DHCP process initiated by the augmented configuration message 100 from network device 14D. If the tactical radio 716 is not configured to provide DHCP service, network device 14D may monitor the radio interface and obtain an interface IP address as well as a MAC address by capturing and analyzing an Ethernet frame transmitted by tactical radio 716. For example, a multicast enabled tactical radio 716 may transmit Internet Group Management Protocol (IGMP) queries periodically. Network device 14D may use address resolution protocol (ARP) to obtain and verify the MAC address of the radio interface, thereby confirming the IP address of the radio interface obtained. Alternatively, network device 14D may obtain the MAC address of the radio interface by analyzing a captured Ethernet frame. Network device 14D may then use reverse ARP to obtain the IP address of the radio interface. Upon determining the IP address of the radio interface, network device 14D may then initiate configuration by sending a multicast discover message (304) to configuration computing system 10A.

Figure 11:
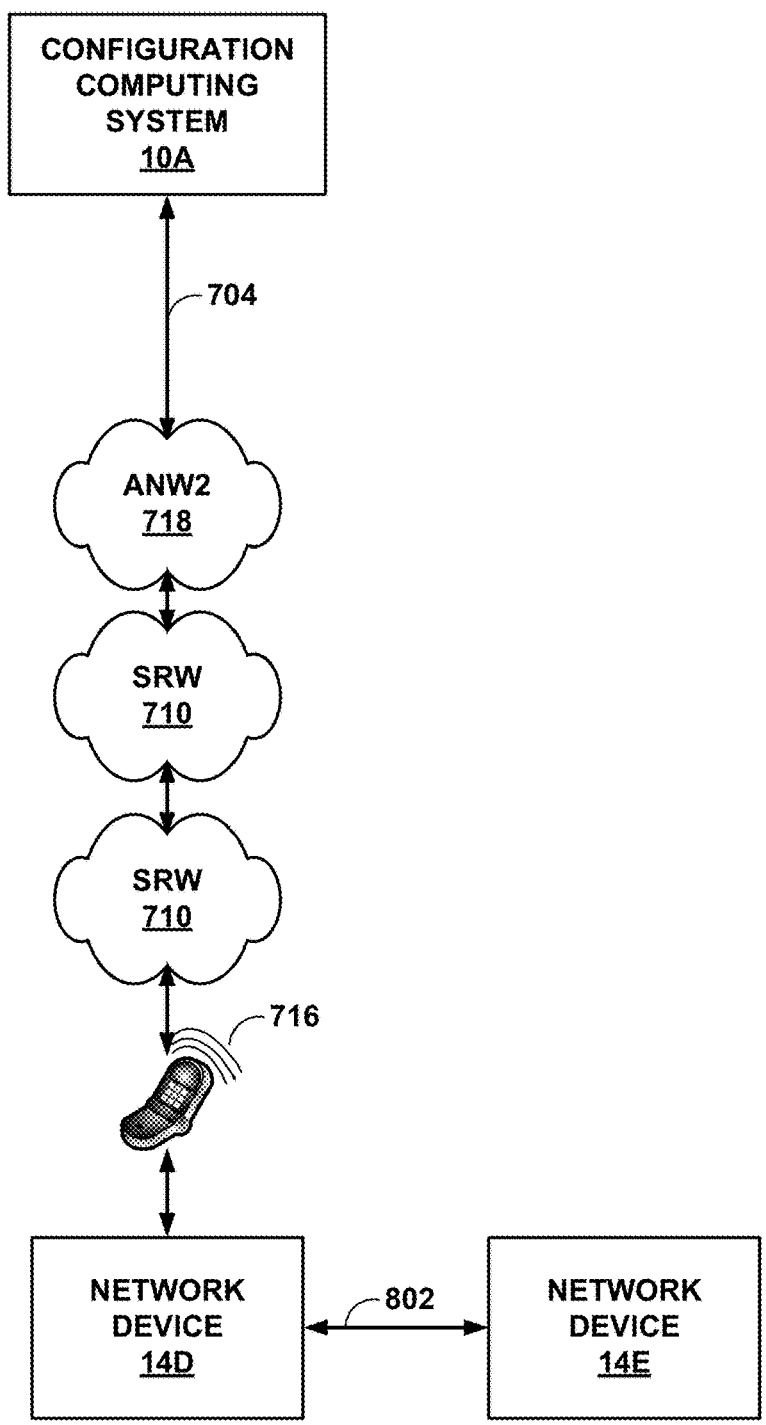
FIG. 11 is a block diagram illustrating another example connection scenario for the configuration of network devices, in accordance with one or more aspects of the present disclosure.

FIG. 11 is a block diagram illustrating another example connection scenario for the configuration of network devices 14D and 14E. In one example, network device 14D may broadcast a configuration relay message 802 within its subnet to new network devices 14 within the subnet. For instance, when network device 14D has been initialized by configuration computing system 10A, it continues to listen for configuration messages from new network devices 14, such as network device 14E. Because network device 14D is properly configured, network device 14D may transmit a configuration relay message 802 (as shown in step 610 of FIG. 9) to network device 14E located within the same subnet in the absence of a relay-capable router in the subnet. Network device 14D may generate and transmit the configuration relay message to indicate its willingness to relay the configuration messages for network device 14E. If more than one network device 14 may act as a relay agent, than the network device 14 with the lowest IP or highest IP address may be elected as the relay agent for the subnet.

Figure 12:
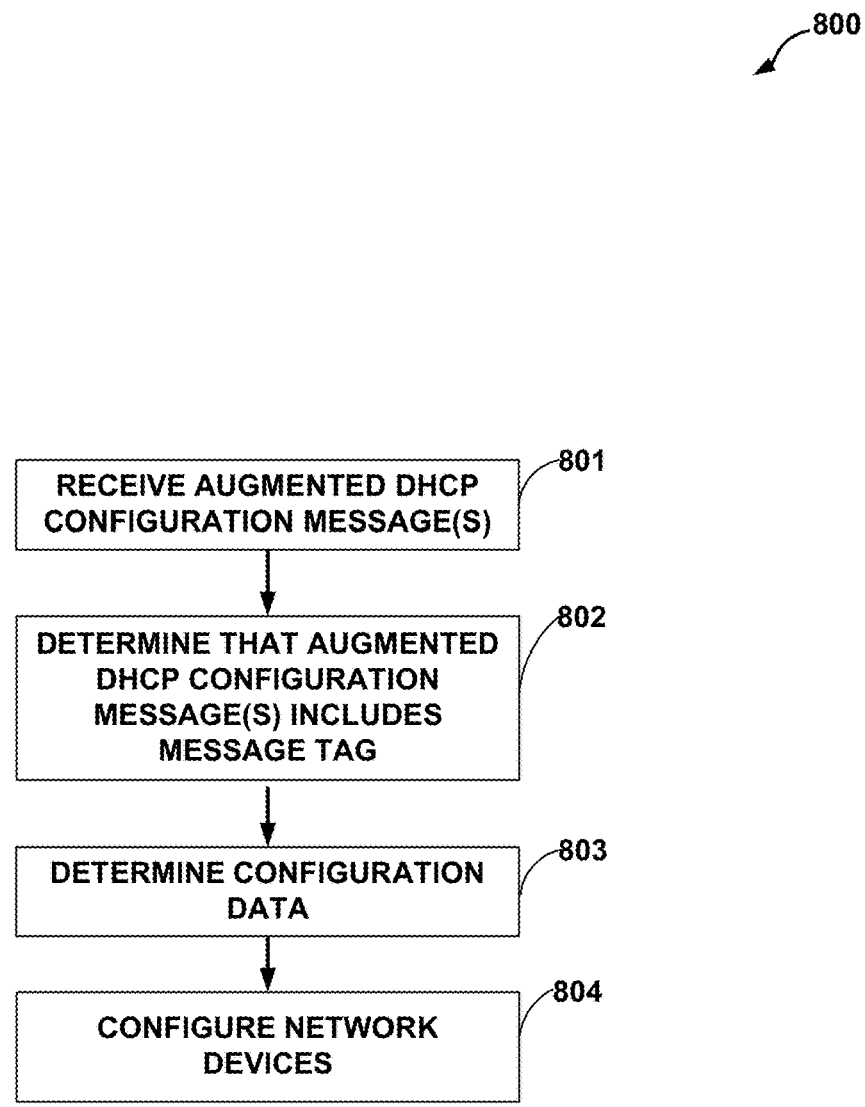
FIG. 12 illustrates a flow diagram illustrating an example configuration method of configuration computing systems, in accordance with one or more aspects of the disclosure.

FIG. 12 illustrates a flow diagram illustrating an example configuration method 800 of configuration computing systems 10, in accordance with one or more aspects of the disclosure. One of network devices 14 may transmit an augmented DHCP configuration message to any available configuration computing systems 10 to request configuration in accordance with the DHCP-T protocol. One of configuration computing systems 10 may receive the one or more augmented DHCP configuration messages from the network device 14 that transmitted the augmented DHCP configuration messages (801). Messaging module 22 of the configuration computing system 10 that received the augmented DHCP configuration messages may determine whether the received message includes a message tag indicating that the respective augmented DHCP configuration message contains parameter information that includes a client identifier (e.g., user log-in role, a Unit Reference Number, or a media access control address) uniquely associated with the network device 14 (802). For instance, messaging module 22 may determine a configuration message header 120 field within the augmented DHCP configuration message received from the network device 14. This may trigger the configuration computing system 10 to determine, based on the parameter information included in the augmented DHCP configuration messages, configuration data that is usable to configure the network device 14 that transmitted the augmented DHCP configuration messages (803). For example, modular interface adapter 30 of the configuration computing system 10 that received the augmented DHCP configuration message may query from one or more data sources 40 that stores configuration data 16 associated with the network device 14. After querying the configuration data 16, the configuration computing system 10 may transmit the configuration data 16 to the network device 14 that initially transmitted the augmented DHCP configuration message. For instance, messaging module 22 may generate an augmented DHCP configuration message with a configuration message header 120 field and a configuration message data 122 field with the configuration data 16 retrieved from data source 40. Configuration computing system 10 may then configure the network devices 14 by transmitting and receiving augmented DHCP configuration messages with configuration data (804).

Figure 13:
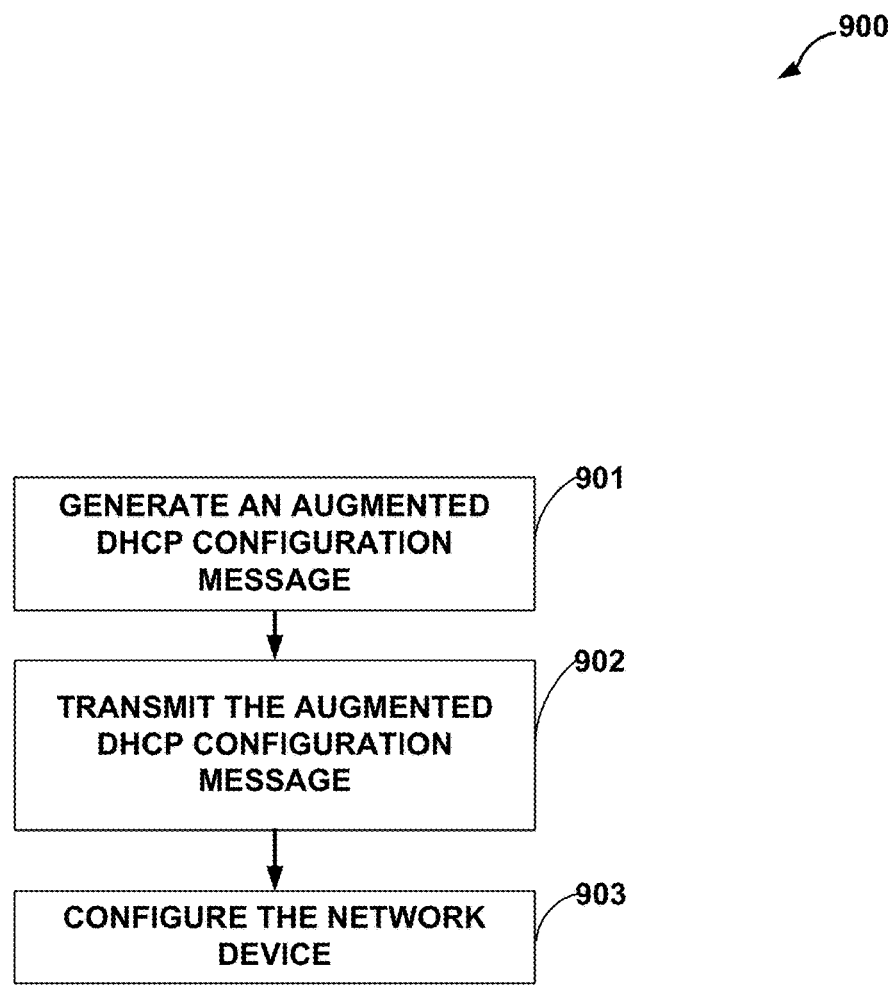
FIG. 13 illustrates a flow diagram illustrating another example configuration method of network devices, in accordance with one or more aspects of the disclosure.

FIG. 13 illustrates a flow diagram illustrating another example configuration method 900 of network devices 14, in accordance with one or more aspects of the disclosure. One of network devices 14 may request configuration in accordance with the DHCP-T protocol. In one instance, network users 4 may select to configure one of network devices 14 with device configuration interface 48 in accordance with the DHCP-T protocol. Identifier unit 46 of the selected network device 14 may then identify a client identifier (e.g., user log-in role, a Unit Reference Number, or a media access control address) uniquely associated with the network devices 14. An augmented DHCP configuration message is then generated, wherein each of the one or more augmented DHCP configuration messages includes a message tag indicating that the respective augmented DHCP configuration message contains additional parameter information that includes a client identifier uniquely associated with a respective one of the one or more network devices (901). For example, device messaging module 44 generates an augmented DHCP configuration message including a configuration message header 120 and a configuration message data 122 field with client identifier information so that the network device 14 may request configuration according to the DHCP-T protocol from configuration computing systems 10. The network device 14 may then transmit the augmented DHCP configuration message to the configuration computing systems 10 (902). Transmitting the augmented DHCP configuration message initiates the configuration process of the network device 14. The network device 14 may then be configured based on configuration data transmitted and received from the configuration computing system 10 (903).

Figure 14:
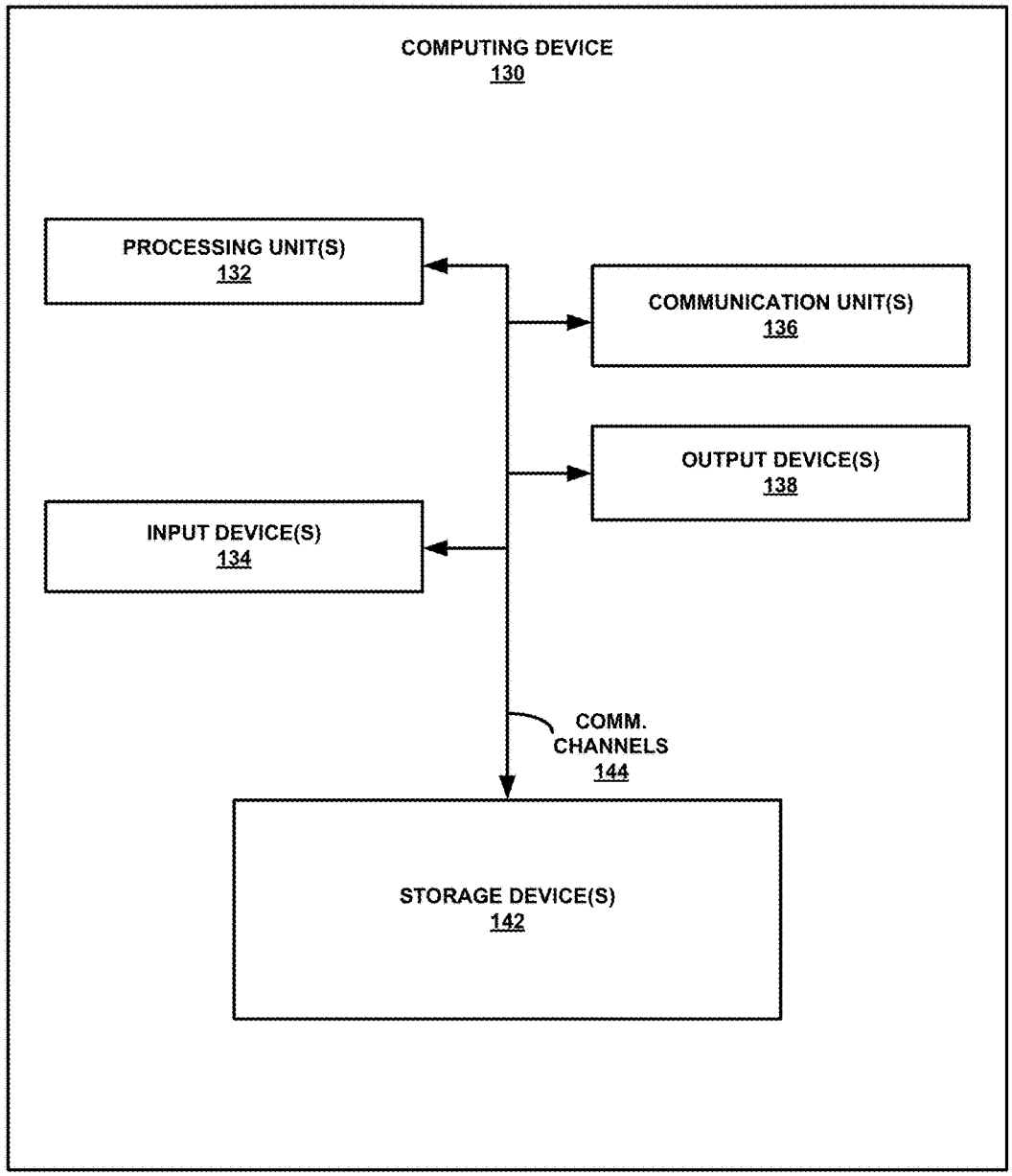
FIG. 14 is a block diagram illustrating further details of an example computing device, in accordance with one or more aspects of the present disclosure.

FIG. 14 is a block diagram illustrating further details of an example computing device 130, in one aspect of the present disclosure. FIG. 14 illustrates a computing device 130, which may be one example of one of configuration computing systems 10 and/or one of network devices 14, and many other examples of computing device 130 may be used in other instances and may include a subset of the components shown, or may include additional components not shown, in FIG. 14.

As shown in the example of FIG. 14, computing device 130 includes one or more processing units 132, one or more input devices 134, one or more communication units 136, one or more output devices 138, and one or more storage devices 142. Communication channels 144 may interconnect each of the components 132, 134, 136, 138, and 142 for inter-component communications (physically, communicatively, and/or operatively). In some examples, communication channels 144 may include a system bus, a network connection, an inter-process communication data structure, or any other method for communicating data between hardware and/or software.

One or more input devices 134 of computing device 130 may receive input. Examples of input are tactile, audio, and video input. Examples of input devices 134 include a presence-sensitive screen, touch-sensitive screen, mouse, keyboard, voice responsive system, video camera, microphone or any other type of device for detecting input from a human or machine.

One or more output devices 138 of computing device 130 may generate output. Examples of output are tactile, audio, and video output. Examples of output devices 138 include a presence-sensitive screen, sound card, video graphics adapter card, speaker, cathode ray tube (CRT) monitor, liquid crystal display (LCD), or any other type of device for generating output to a human or machine. Output devices 138 may include display devices such as cathode ray tube (CRT) monitor, liquid crystal display (LCD), or any other type of device for generating tactile, audio, and/or visual output.

One or more communication units 136 of computing device 130 may communicate with one or more other computing systems or devices via one or more networks by transmitting and/or receiving network signals on the one or more networks. Examples of communication unit 136 include a network interface card (e.g. such as an Ethernet card), an optical transceiver, a radio frequency transceiver, or any other type of device that can send and/or receive information, such as through a wired or wireless network. Other examples of communication units 44 may include short wave radios, cellular data radios, wireless Ethernet network radios, as well as universal serial bus (USB) controllers.

One or more storage devices 142 within computing device 130 may store information for processing during operation of computing device 130 (e.g., computing device 130 may store data accessed by one or more modules, processes, applications, or the like during execution at computing device 130). In some examples, storage devices 142 on computing device 130 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art. In some cases, storage devices 142 may include redundant array of independent disks (RAID) configurations and one or more solid-state drives (SSD's).

Storage devices 142, in some examples, also include one or more computer-readable storage media. Storage devices 142 may be configured to store larger amounts of information than volatile memory. Storage devices 142 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 48 may store program instructions and/or data associated with one or more software/firmware elements or modules in accordance with the techniques described herein.

For example, when computing device 130 comprises an example of one of configuration computing systems 10 (as shown in FIGS. 1-3, 6-12), storage devices 142 may store instructions and/or data associated with configuration database 50, configuration interface 18, modular interface adapter 30, messaging module 22, and server core 20. In another example, when computing device 130 comprises an example of one of network devices 14 (as shown in FIGS. 1-3, 6, 8-11, 13), storage devices 142 may store instructions and/or data associated with identifier unit 46, device messaging module 44, and device configuration interface 48. The computer-readable storage media of the configuration computing systems 10 and/or network devices 14 may, for example, store program instructions to execute the configuration methods described herein (e.g., FIGS. 6-9, 12, and 13).

Computing device 130 further includes one or more processing units 132, such as one or more digital signal processors (DSPs), general purpose microprocessors, application specific integrated circuits (ASICs), field programmable logic arrays (FPGAs), or other equivalent integrated or discrete logic circuitry that may implement functionality and/or execute instructions within computing device 130. For example, processing units 132 may receive and execute instructions stored by storage devices 142 that execute the functionality of the elements and/or modules described herein. These instructions executed by processing units 132 may cause computing device 130 to store information within storage devices 142 during program execution. Accordingly, the term "processing unit" or "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processing units (e.g., processors) to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processing units as described above, in conjunction with suitable software and/or firmware.

It is to be recognized that, depending on the embodiment, certain acts or events of any of the methods described herein can be performed in a different sequence, may be added, merged, or left out altogether (e.g., not all described acts or events are necessary for the practice of the method). Moreover, in certain embodiments, acts or events may be performed concurrently, e.g., through multi-threaded processing, interrupt processing, or multiple processing units, rather than sequentially.

In some examples, a computer-readable storage medium comprises a non-transitory medium. The term "non-transitory" indicates that the storage medium is not embodied in a carrier wave or a propagated signal. In certain examples, a non-transitory storage medium may store data that can, over time, change in RAM or cache).

Various examples have been described. These and other examples are within the scope of the following claims.

What is claimed is:

1. A method comprising:
in a Dynamic Host Configuration Protocol (DHCP) network comprising one or more configuration computing systems and one or more network devices, receiving, by the one or more configuration computing systems and from the one or more network devices, one or more augmented DHCP configuration messages;
determining, by the one or more configuration computing systems, that each of the one or more augmented DHCP configuration messages includes a message tag indicating that the respective augmented DHCP configuration message contains parameter information that includes a client identifier associated with a respective one of the one or more network devices, wherein each client identifier comprises at least one of a user log-in role or a reference number associated with a unit role or an organizational division of a network user of the respective one of the one or more network devices;
determining, by the one or more configuration computing systems, respective configuration data uniquely associated with the corresponding client identifiers included in the one or more augmented DHCP configuration messages that are usable to configure the one or more network devices; and
configuring, by the one or more configuration computing systems, based on the corresponding configuration data uniquely associated with the corresponding client identifiers, the one or more network devices.

2. The method of claim 1, wherein the respective message tag included in each of the one or more augmented DHCP configuration messages comprises one or more flag bits that are included in a configuration message header field of the respective augmented DHCP configuration message.

3. The method of claim 1, wherein respective parameter information included in each of the one or more augmented DHCP configuration messages comprises one or more configuration data bits that are included in a configuration message data field of the respective DHCP configuration message.

4. The method of claim 1, wherein configuring the one or more network devices comprises generating, by the one or more configuration computing systems, a respective configuration offer message to offer a lease of a respective Internet Protocol address to the one or more network devices.

5. The method of claim 4, wherein each respective configuration offer message comprises a request for the respective client identifier associated with each of the one or more network devices.

6. The method of claim 4, wherein configuring the one or more network devices further comprises transmitting, by the one or more configuration computing systems and to each of the one or more network devices, the respective configuration offer message.

7. The method of claim 1, wherein configuring the one or more network devices comprises generating, by the one or more configuration computing systems, respective configuration parameters messages to acknowledge respective configuration requests sent from the one or more network devices, wherein the configuration parameters messages include the respective configuration data uniquely associated with the corresponding client identifiers included in the one or more augmented DHCP configuration messages that are usable to configure the one or more network devices.

8. The method of claim 7, wherein configuring the one or more network devices further comprises transmitting, by the one or more configuration computing systems and to each of the one or more network devices, the respective configuration parameters message.

9. The method of claim 1, further comprising:
generating, by the one or more configuration computing systems, a data source query message to obtain the configuration data from one or more data sources;
transmitting, by the one or more configuration computing systems and to the one or more data sources, the data source query message; and
responsive to transmitting the data source query message, receiving, by the one or more configuration computing systems and from the one or more data sources, the configuration data.

10. The method of claim 9, wherein the configuration data further comprises at least one Internet Protocol address, at least one reference number, at least one role name, or at least one mission related data.

11. The method of claim 9, further comprising:
generating, by the one or more configuration computing systems, an update data source query message to obtain updated configuration data from one or more data sources;
transmitting, by the one or more configuration computing systems and to the one or more data sources, the update data source query message;
responsive to transmitting the update data source query message, receiving, by the one or more configuration computing systems and from the one or more data sources, the updated configuration data, wherein configuring the one or more network devices is based on the updated configuration data.

12. The method of claim 1, further comprising:
generating, by the one or more configuration computing systems, a respective configuration inform message to inform each of the one or more network devices to initialize configuration using at least a portion of the configuration data; and
transmitting, by the one or more configuration computing systems and to each of the one or more network devices, the respective configuration inform message.

13. A method comprising:
in a Dynamic Host Configuration Protocol (DHCP) network comprising one or more network devices and one or more configuration computing systems, generating, by the one or more network devices, one or more augmented DHCP configuration messages, wherein each of the one or more augmented DHCP configuration messages includes a message tag indicating that the respective augmented DHCP configuration message contains additional parameter information that includes a client identifier associated with a respective one of the one or more network devices, wherein each client identifier comprises at least one of a user log-in role or a reference number associated with a unit role or an organizational division of a network user of the respective one of the one or more network devices;
transmitting, by the one or more network devices and to the one or more configuration computing systems, the one or more augmented DHCP configuration messages to request that the one or more configuration computing systems configure the one or more network devices; and
responsive to transmitting the one or more augmented DHCP configuration messages, configuring, based on respective configuration data uniquely associated with the corresponding client identifiers included in the one or more augmented DHCP configuration messages and received from the one or more configuration computing systems, the one or more network devices.

14. The method of claim 13, wherein the respective message tag included in each of the one or more augmented DHCP configuration messages comprises one or more flag bits that are included in a configuration message header field of the respective augmented DHCP configuration message.

15. The method of claim 13, wherein respective parameter information included in each of the one or more augmented DHCP configuration messages comprises one or more configuration data bits that are included in a configuration message data field of the respective DHCP configuration message.

16. The method of claim 13, wherein configuring the one or more network devices comprises:
receiving, by the one or more network devices and from the one or more configuration computing systems, one or more additional augmented DHCP configuration messages, wherein the one or more additional augmented DHCP configuration messages comprises a configuration offer message with an offer to lease a respective Internet Protocol address; and
responsive to receiving the one or more additional augmented DHCP configuration messages, generating, by the one or more network devices, a response message.

17. The method of claim 16, wherein generating the response message comprises generating a configuration request message for requesting the configuration data from the one or more configuration computing systems.

18. The method of claim 16, wherein generating the response message comprises generating a decline configuration message for informing the one or more configuration computing systems that a suggested network address is invalid.

19. The method of claim 16, wherein generating the response message comprises generating a release configuration message for relinquishing an Internet Protocol (IP) address configured by the one or more configuration computing systems.

20. The method of claim 16, wherein generating the response message comprises:
   generating a configuration relay message for relaying the one or more augmented DHCP configuration messages from an un-configured network device in the same subnet as the one or more network devices; and
   transmitting, by the one or more network devices to the un-configured network device, the configuration relay message.

21. The method of claim 13, wherein generating the one or more augmented DHCP configuration messages further comprises generating the one or more augmented DHCP configuration messages in response to receiving a configuration inform message from the one or more configuration computing systems for informing the one or more network devices to initiate configuration.

22. The method of claim 13, wherein transmitting the one or more augmented DHCP configuration messages comprises transmitting a multicast discover message, and wherein the network device is directly coupled to a radio.

23. A system comprising:
   one or more processors;
   one or more computer-readable storage media;
   program instructions, stored on the one or more computer-readable storage media for execution by the one or more processors to receive one or more augmented DHCP configuration messages;
   program instructions, stored on the one or more computer-readable storage media for execution by the one or more processors to determine that each of the one or more augmented DHCP configuration messages includes a message tag indicating that the respective augmented DHCP configuration message contains parameter information that includes a client identifier associated with a respective one of the one or more network devices, wherein each client identifier comprises at least one of a user log-in role or a reference number associated with a unit role or an organizational division of a network user of the respective one of the one or more network devices;
   program instructions, stored on the one or more computer-readable storage media for execution by the one or more processors to determine, respective configuration data uniquely associated with the corresponding client identifiers included in the one or more augmented DHCP configuration messages that are usable to configure the one or more network devices; and
   program instructions, stored on the one or more computer-readable storage media for execution by the one or more processors to configure, based on the respective configuration data uniquely associated with the corresponding client identifiers, the one or more network devices.

24. The system of claim 23, wherein the respective message tag included in each of the one or more augmented DHCP configuration messages comprises one or more flag bits that are included in a configuration message header field of the respective augmented DHCP configuration message.

25. The system of claim 23, wherein respective parameter information included in each of the one or more augmented DHCP configuration messages comprises one or more configuration data bits that are included in a configuration message data field of the respective DHCP configuration message.

26. The system of claim 23, wherein the program instructions to configure the one or more network devices comprise program instructions to:
   generate a respective configuration offer message to offer a lease of a respective Internet Protocol address to the one or more network devices; and
   transmit the respective configuration offer message.

27. The system of claim 26, wherein the program instructions to generate the respective configuration offer message comprise program instructions, to request for the respective client identifier associated with each of the one or more network devices.

28. The system of claim 23, wherein the program instructions to configure the one or more network devices comprise program instructions to:
   generate a respective configuration parameters message to acknowledge a respective configuration request sent from the one or more network devices, wherein the configuration parameters message includes configuration data usable to configure the one or more network devices; and
   to transmit the respective configuration parameters message.

29. The system of claim 23, wherein the configuration data further comprises at least one Internet Protocol address, reference number, role name, or mission information.

30. The system of claim 23, further comprising:
   program instructions, stored on the one or more computer-readable storage media for execution by the one or more processors to generate a respective configuration inform message to inform each of the one or more network devices to initialize configuration using at least a portion of the configuration data; and
   program instructions, stored on the one or more computer-readable storage media for execution by the one or more processors to transmit the respective configuration inform message.

31. A system comprising:
   one or more processors;
   one or more computer-readable storage media;
   program instructions, stored on the one or more computer-readable storage media for execution by the one or more processors to generate one or more augmented DHCP configuration messages, wherein each of the one or more augmented DHCP configuration messages includes a message tag indicating that the respective augmented DHCP configuration message contains additional parameter information that includes a client identifier associated with a respective one of the one or more network devices, wherein each client identifier comprises at least one of a user log-in role or a reference number associated with a unit role or an organizational division of a network user of the respective one of the one or more network devices; and
   program instructions, stored on the one or more computer-readable storage media for execution by the one or more processors to transmit the one or more augmented DHCP configuration messages to request that the one or more configuration computing systems configure the one or more network devices;

program instructions, stored on the one or more computer-readable storage media for execution by the one or more processors to configure the one or more network devices based on respective configuration data uniquely associated with the corresponding client identifiers included in the one or more augmented DHCP configuration messages.

32. The system of claim 31, wherein the respective message tag included in each of the one or more augmented DHCP configuration messages comprise one or more flag bits that are included in a configuration message header field of the respective augmented DHCP configuration message.

33. The system of claim 31, wherein respective parameter information included in each of the one or more augmented DHCP configuration messages comprise one or more configuration data bits that are included in a configuration message data field of the respective DHCP configuration message.

34. The system of claim 31, further comprising:
program instructions, stored on the one or more computer-readable storage media for execution by the one or more processors to receive one or more additional augmented DHCP configuration messages, wherein the one or more additional augmented DHCP configuration messages comprises a configuration offer message with an offer to lease a respective Internet Protocol address; and
program instructions, stored on the one or more computer-readable storage media for execution by the one or more processors to generate, in response to receiving the one or more additional augmented DHCP configuration messages, a response message.

35. The system of claim 34, wherein the program instructions to generate the response message comprise program instructions to generate a configuration request message for requesting the configuration data from the one or more configuration computing systems.

36. The system of claim 34, wherein the program instructions to generate the response message comprises program instructions to:
generate a configuration relay message for relaying the one or more augmented DHCP configuration messages from an un-configured network device in the same subnet as the one or more network devices; and
transmit, by the one or more network devices to the un-configured network device, the configuration relay message.

37. The system of claim 31, wherein the program instructions to generate one or more augmented DHCP configuration messages further comprises program instructions, stored on at least one or more processors to generate the one or more augmented DHCP configuration messages in response to receiving a configuration inform message from the one or more configuration computing systems for informing the one or more network devices to initiate configuration.

\* \* \* \* \*